United States Patent
Collins

(10) Patent No.: US 6,560,361 B1
(45) Date of Patent: May 6, 2003

(54) DRAWING PIXMAP TO VECTOR CONVERSION

(75) Inventor: Robert J. Collins, Studio City, CA (US)

(73) Assignee: Toon Boom Technologies U.S.A., Montreal (CA)

( * ) Notice: Subject to any disclaimer, the term of this patent is extended or adjusted under 35 U.S.C. 154(b) by 0 days.

(21) Appl. No.: 09/543,830

(22) Filed: Apr. 5, 2000

Related U.S. Application Data

(62) Division of application No. 08/520,914, filed on Aug. 30, 1995, now Pat. No. 6,173,075.

(51) Int. Cl.$^7$ .............................. G06K 9/00; G06K 9/46
(52) U.S. Cl. .................... 382/203; 382/164; 382/204
(58) Field of Search ................................ 382/203, 164, 382/171–174, 177–180, 190, 192, 197, 199, 201–205, 207, 209, 210, 217, 224, 229, 232, 235, 239, 240, 241–243, 251, 253, 254, 266, 270, 293, 302, 307, 308, 312; 345/441, 429, 24, 581, 620, 423

(56) References Cited

U.S. PATENT DOCUMENTS

| | | | | |
|---|---|---|---|---|
| 5,214,752 A | * | 5/1993 | Meshkat et al. | ............ 345/423 |
| 5,303,340 A | * | 4/1994 | Gonzalez-Lopez et al. | . 345/441 |
| 5,305,395 A | * | 4/1994 | Mahoney et al. | ........... 382/205 |
| 5,583,949 A | * | 12/1996 | Smith et al. | ................ 382/199 |

OTHER PUBLICATIONS

Lischinski, Dani, *Incremental Delaunay Triangulation*, Graphics Gem IV, pp. 47–59, 1994.
Jon Rokne, *The Area of a Simple Polygon*, Graphics Gems II, pp. 5–6, 1991.
Barber, et al., *The Quickhill Algorithm for Convex Hull*, Geometry Center Technical Report GCG53, pp. 1–18, Jul. 30, 1993.
Preparata, et al., *Proximity: Fundamental Algorithms*, Computational Geomtry An Introduction, Chaper 5, pp. 179–217, 1985.

* cited by examiner

*Primary Examiner*—Andrew W. Johns
*Assistant Examiner*—Duy M. Dang
(74) *Attorney, Agent, or Firm*—Fish & Richardson P.C.

(57) ABSTRACT

A computer method and system for converting a pixmap representing a drawing into a set of points or vectors representing the drawing. Closed loops of points or vectors are traced around boundaries between edge and non-edge pixels in the pixmap; each loop is identified as defining an outer perimeter or as defining a hole associated with some particular outer perimeter; and, for each outer perimeter, an ink art region is defined by an outer perimeter minus any areas defined by any associated holes. Color art vectorization may be created interior to ink art regions. Interior ink art regions may be formed at branches in the drawing. Boundaries may be smoothed and filtered. Drawings may be sized, scaled, or rotated. Vectorization may be extended to color and gray scale drawings.

25 Claims, 30 Drawing Sheets

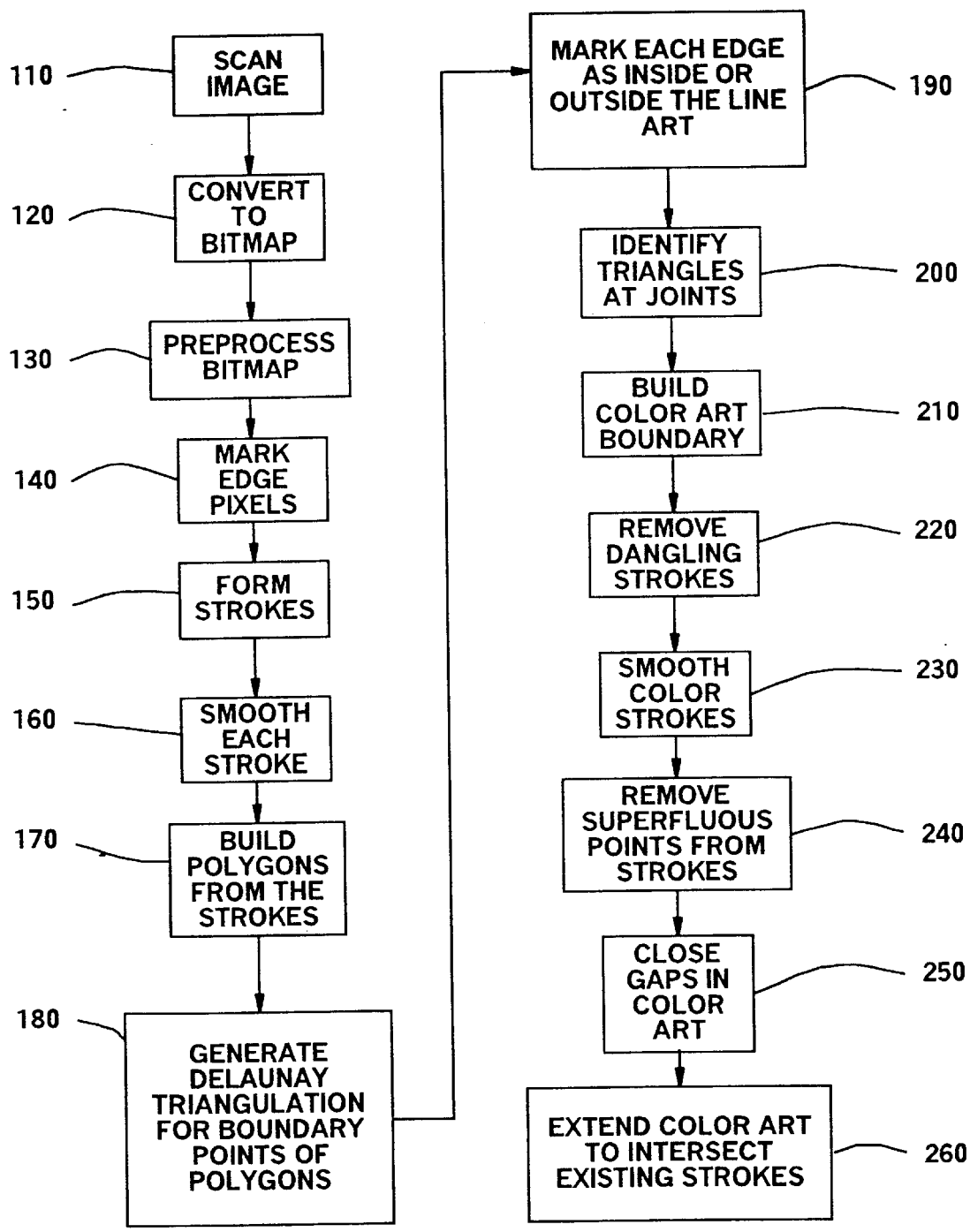
FIG._2A

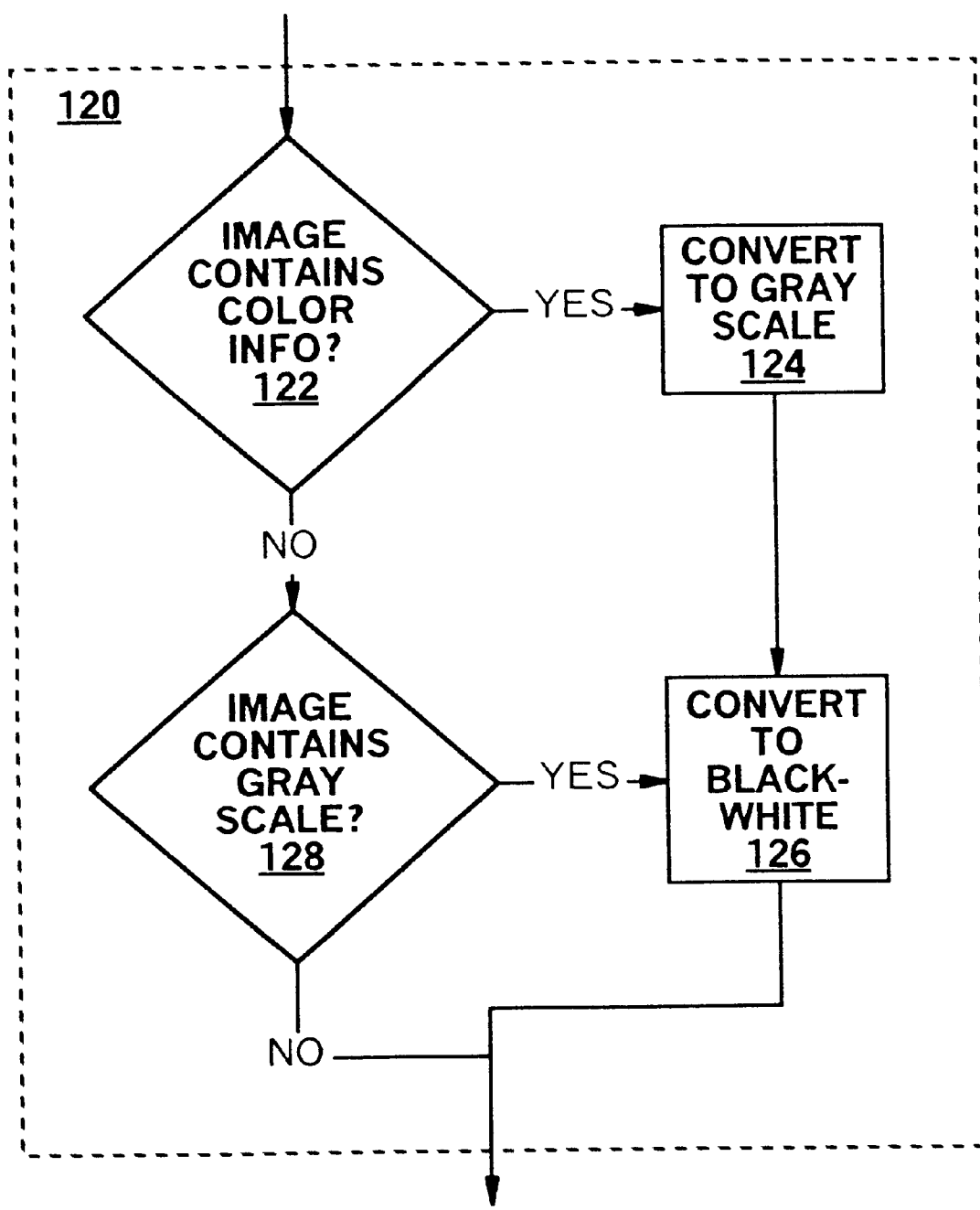
FIG._2B

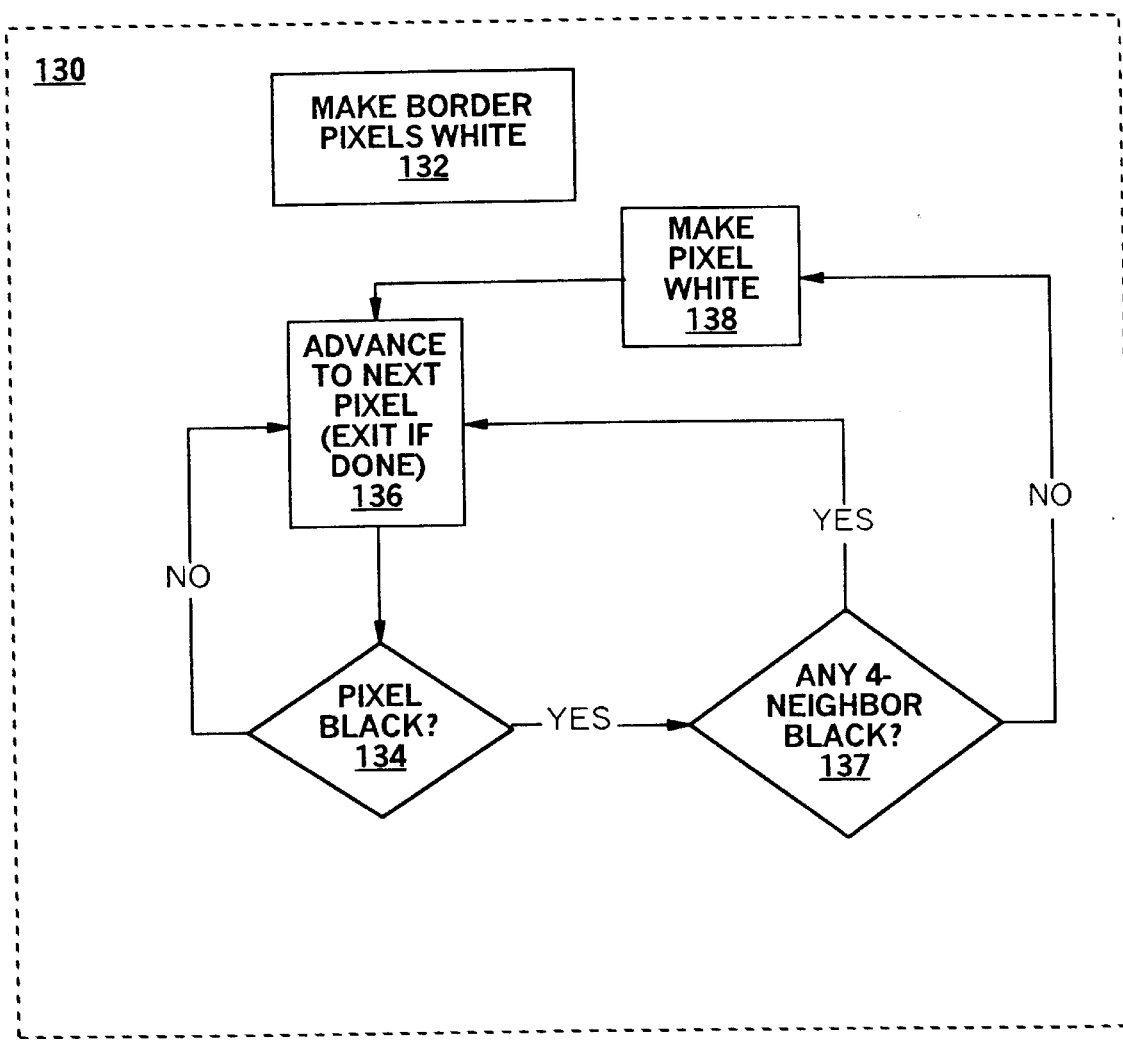
FIG. _2C

FIG._2D (1 OF 2)
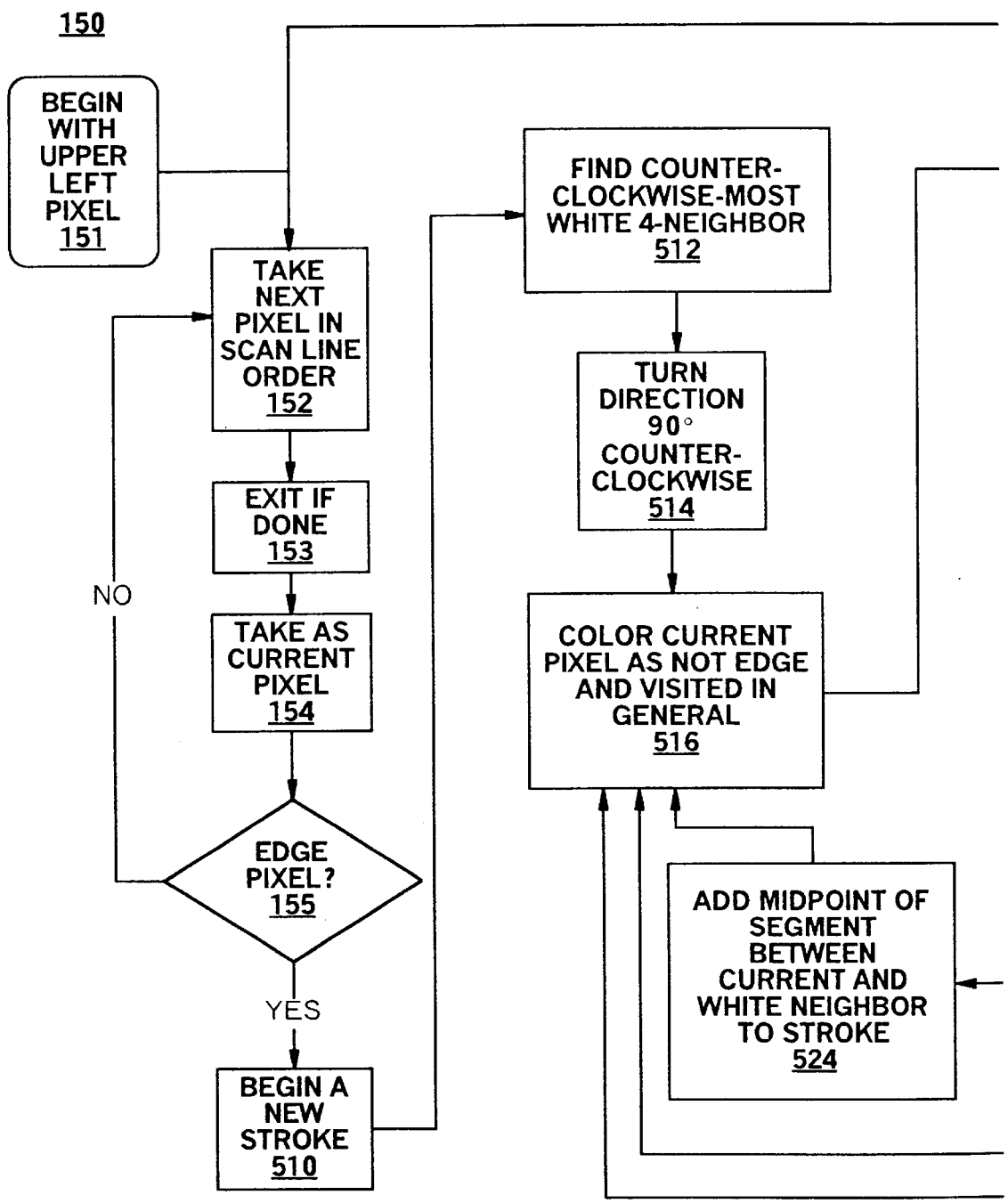

FIG._2D (2 OF 2)
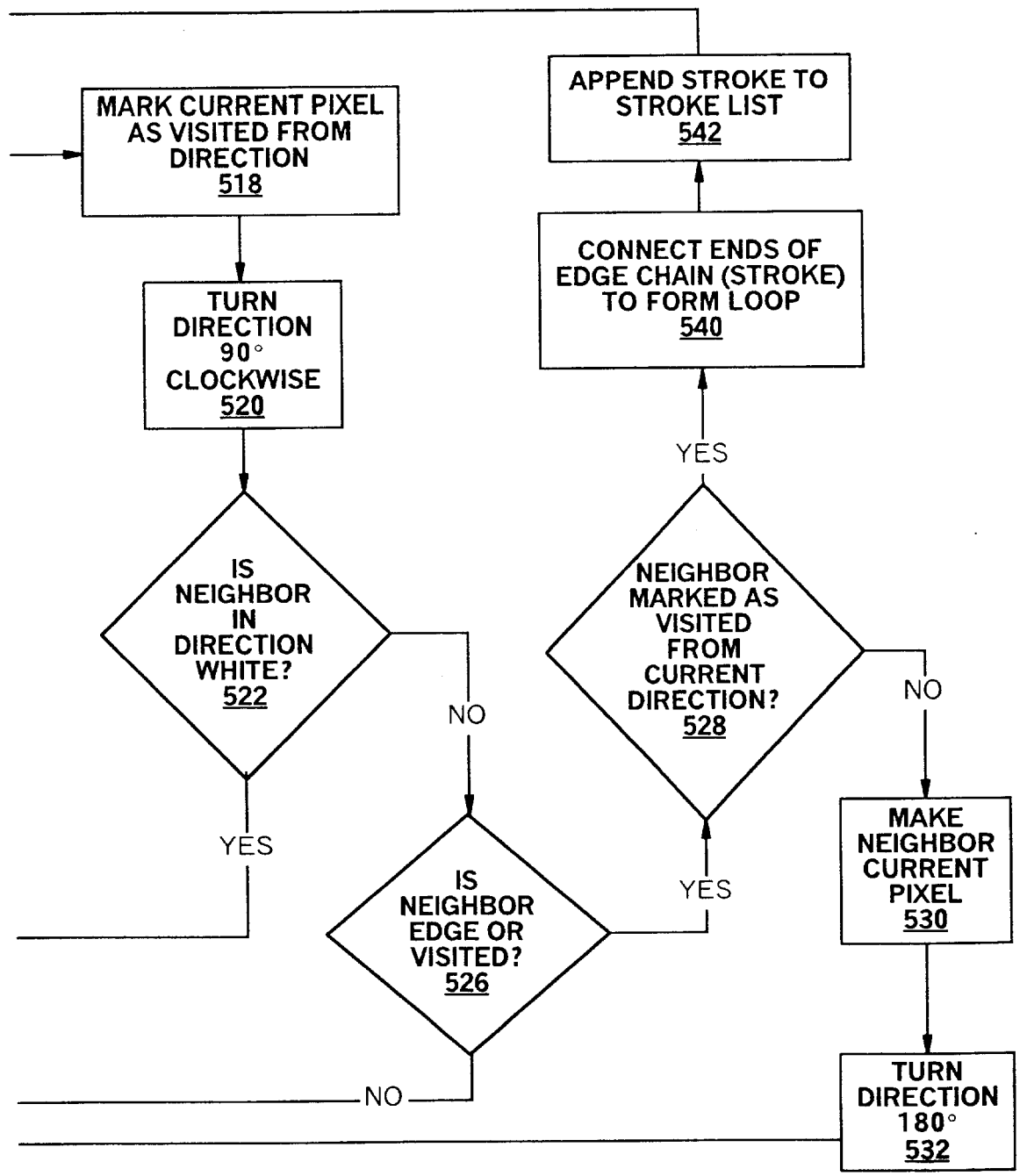

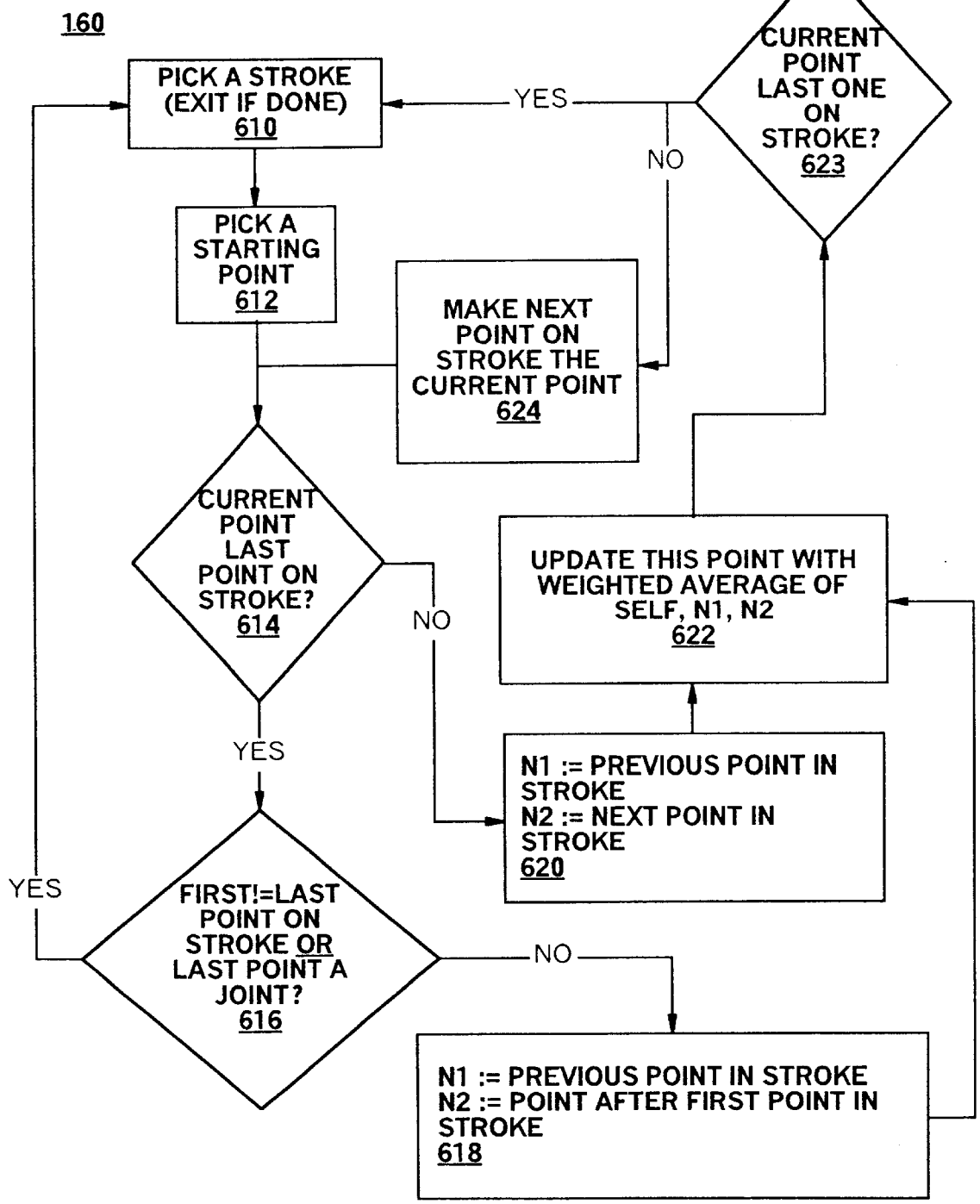
FIG._2E

FIG._2F
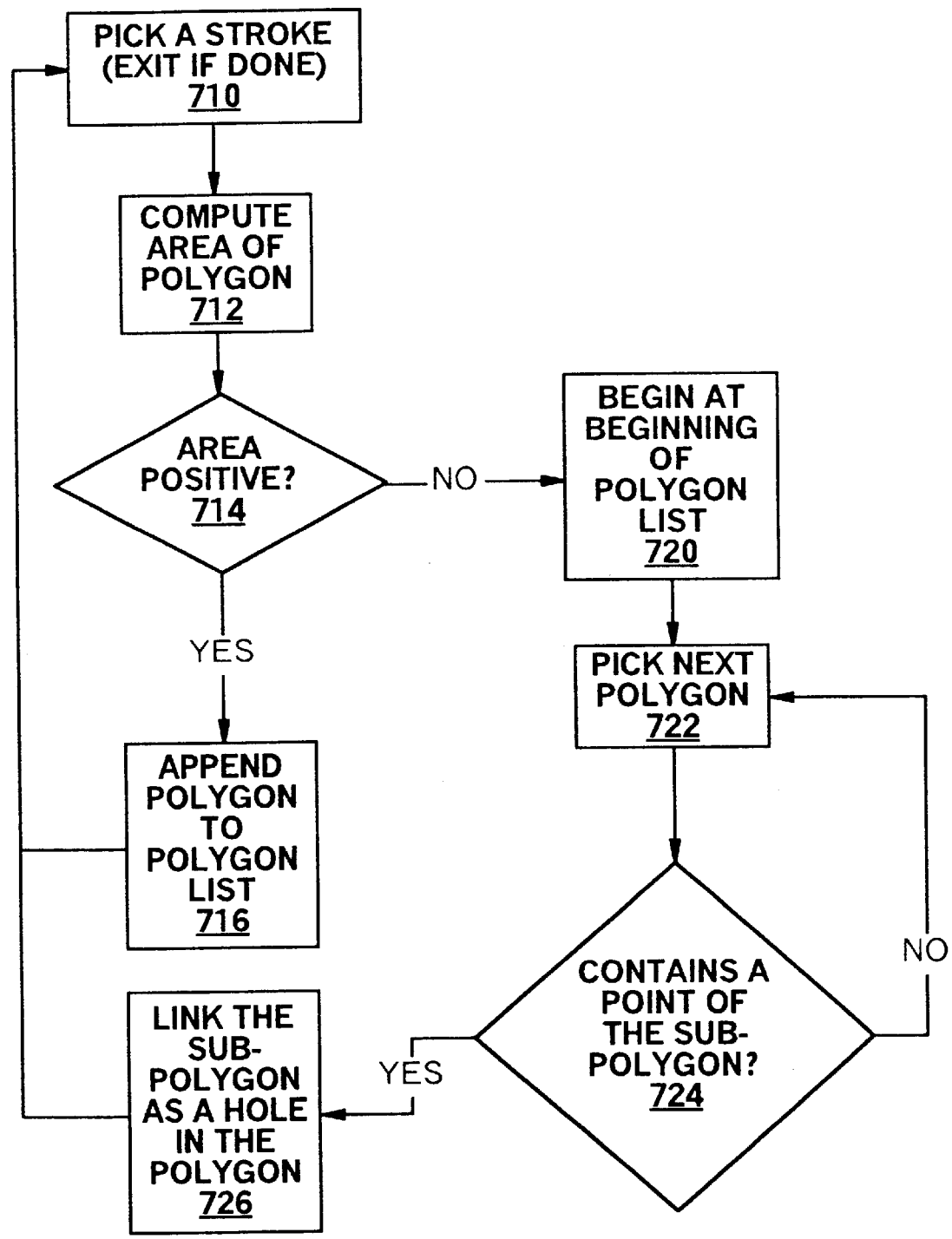

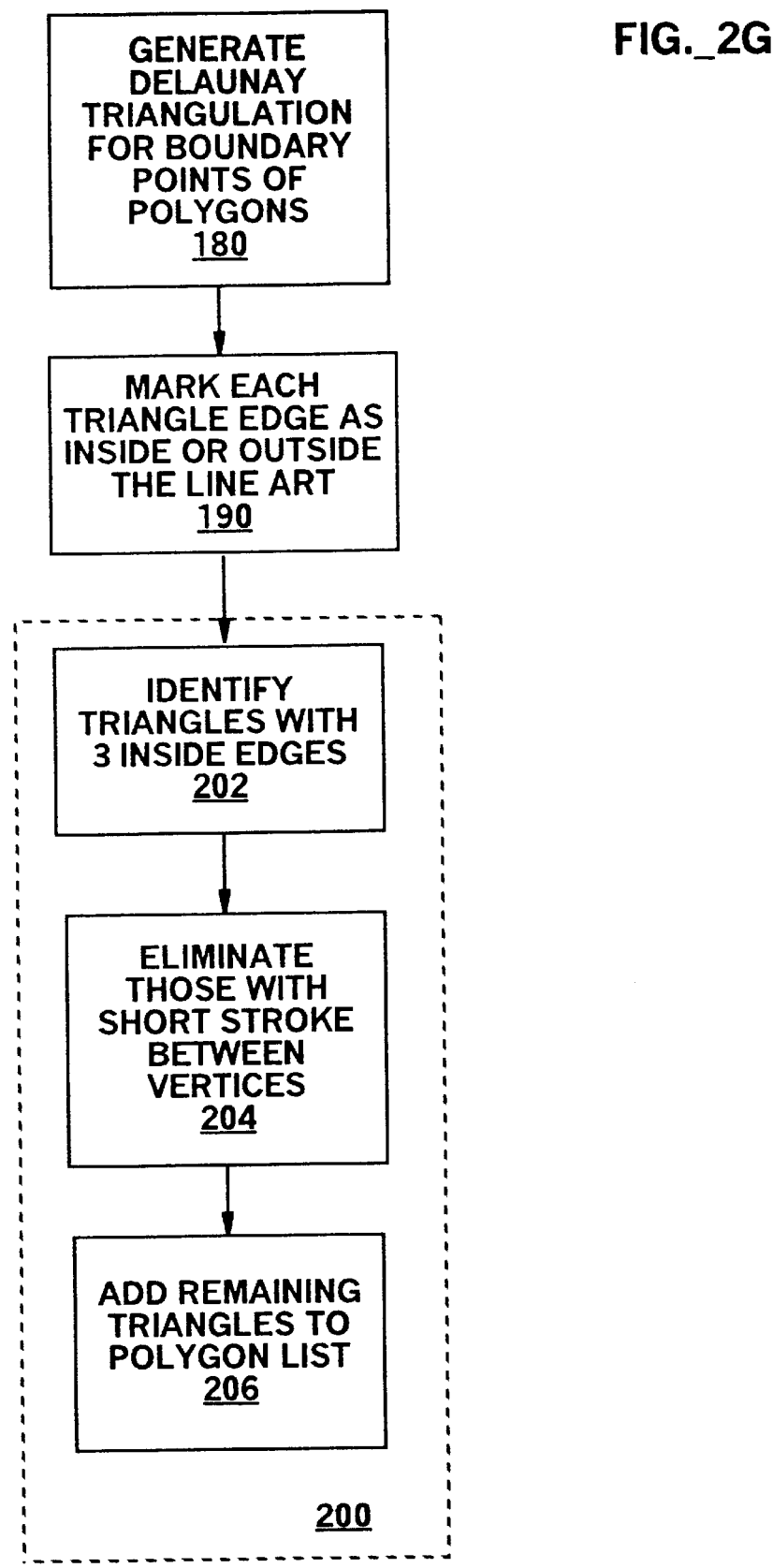
FIG._2G

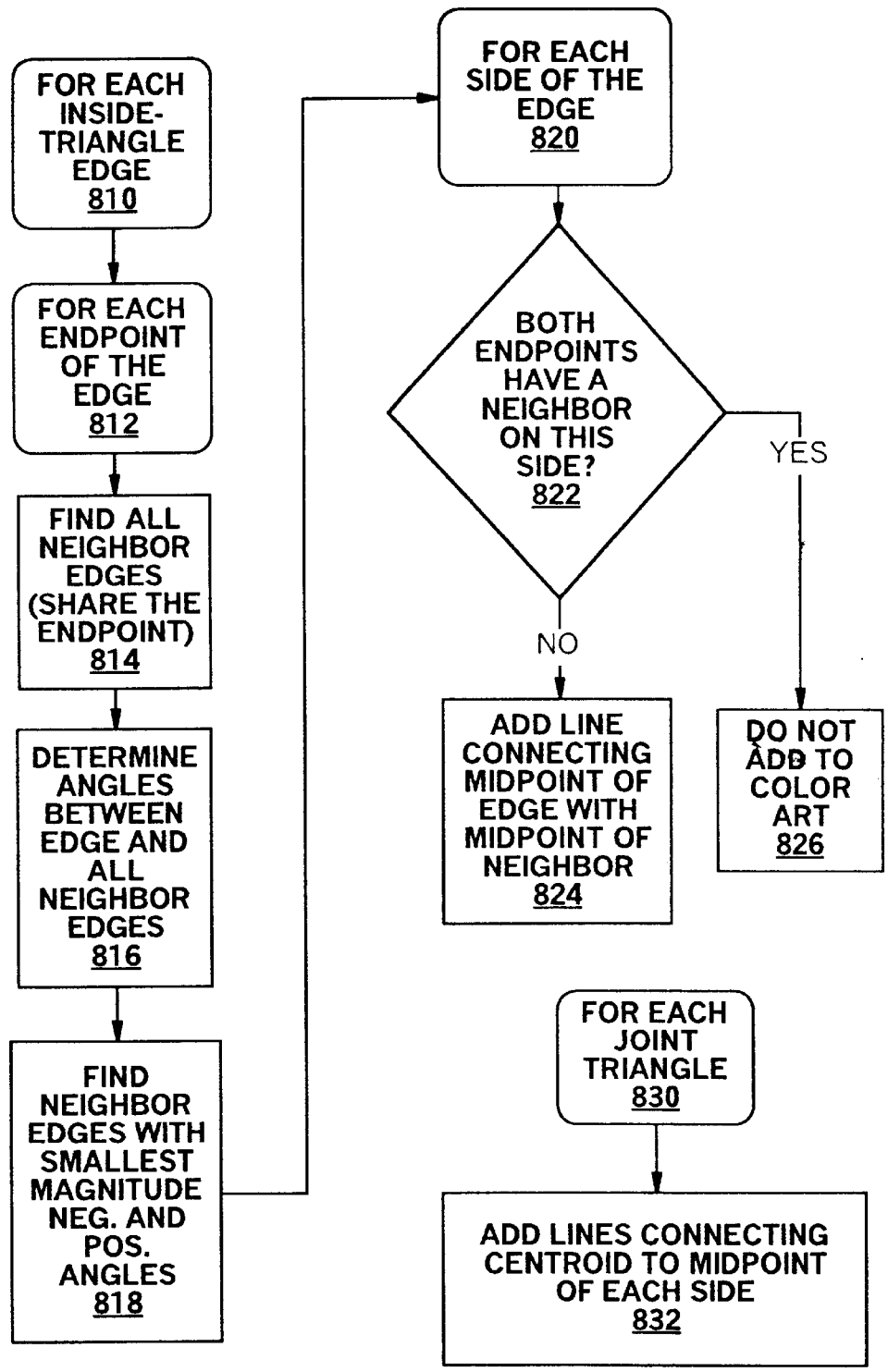
FIG._2H

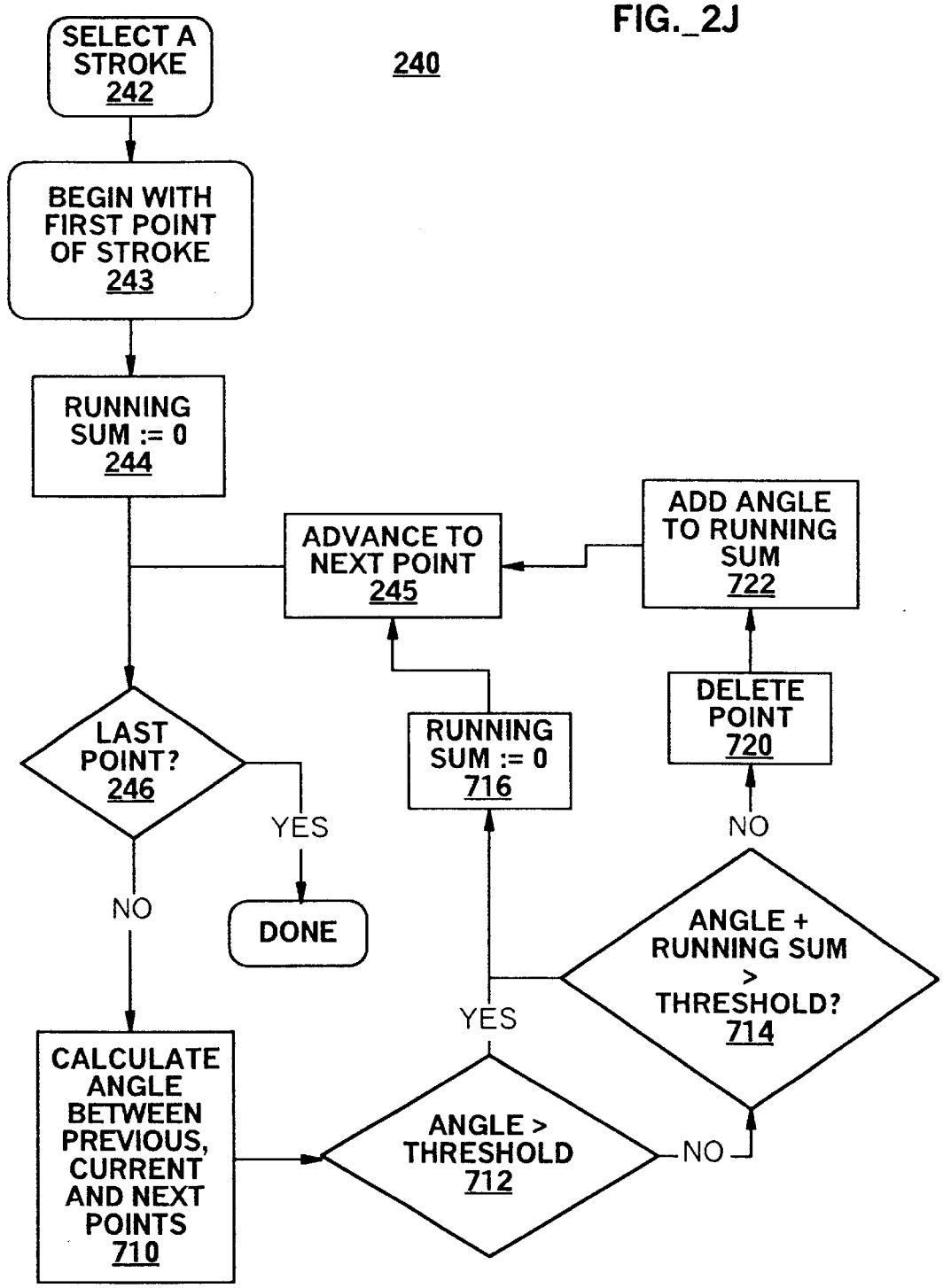
FIG._2J

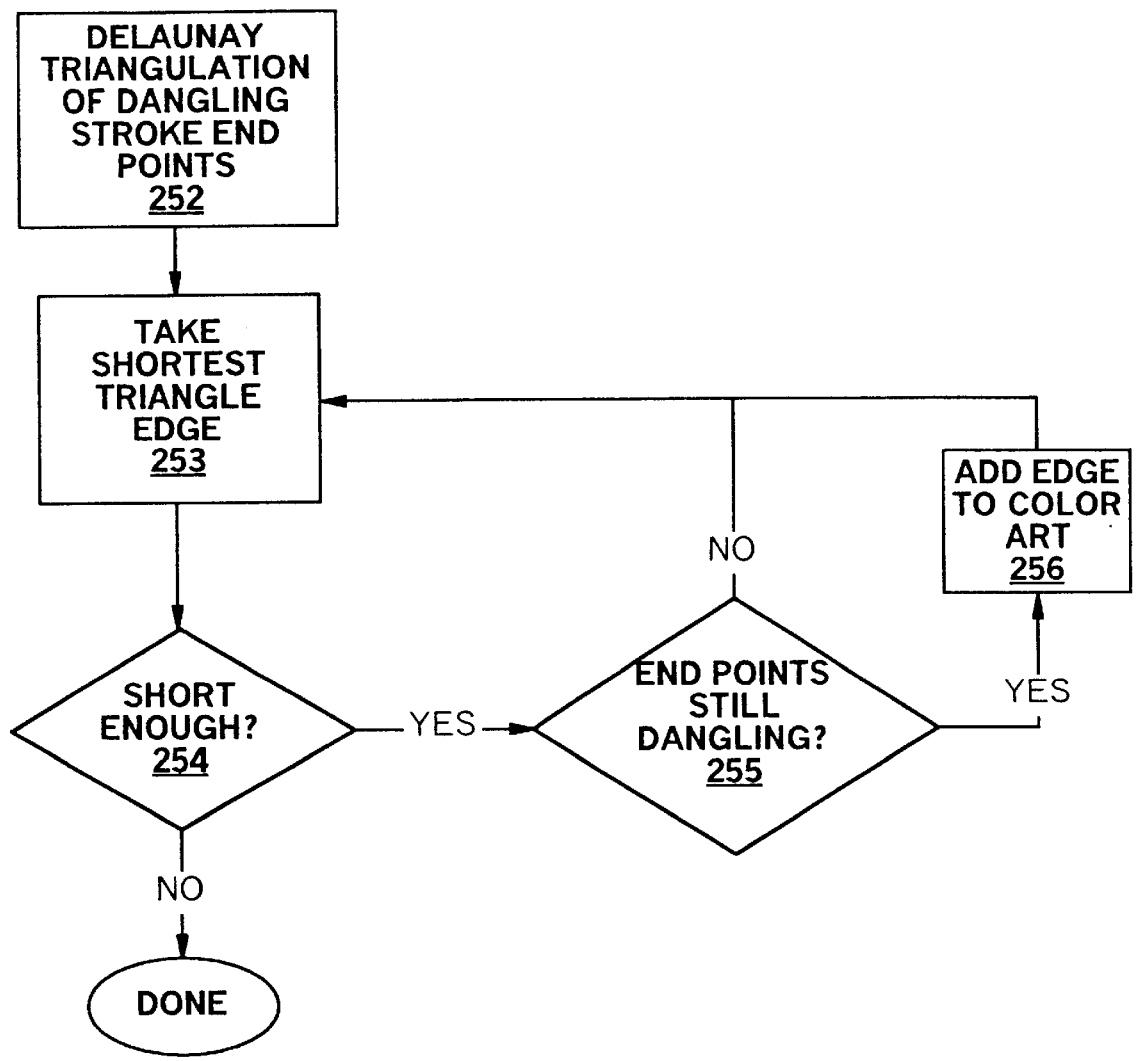
FIG._2K

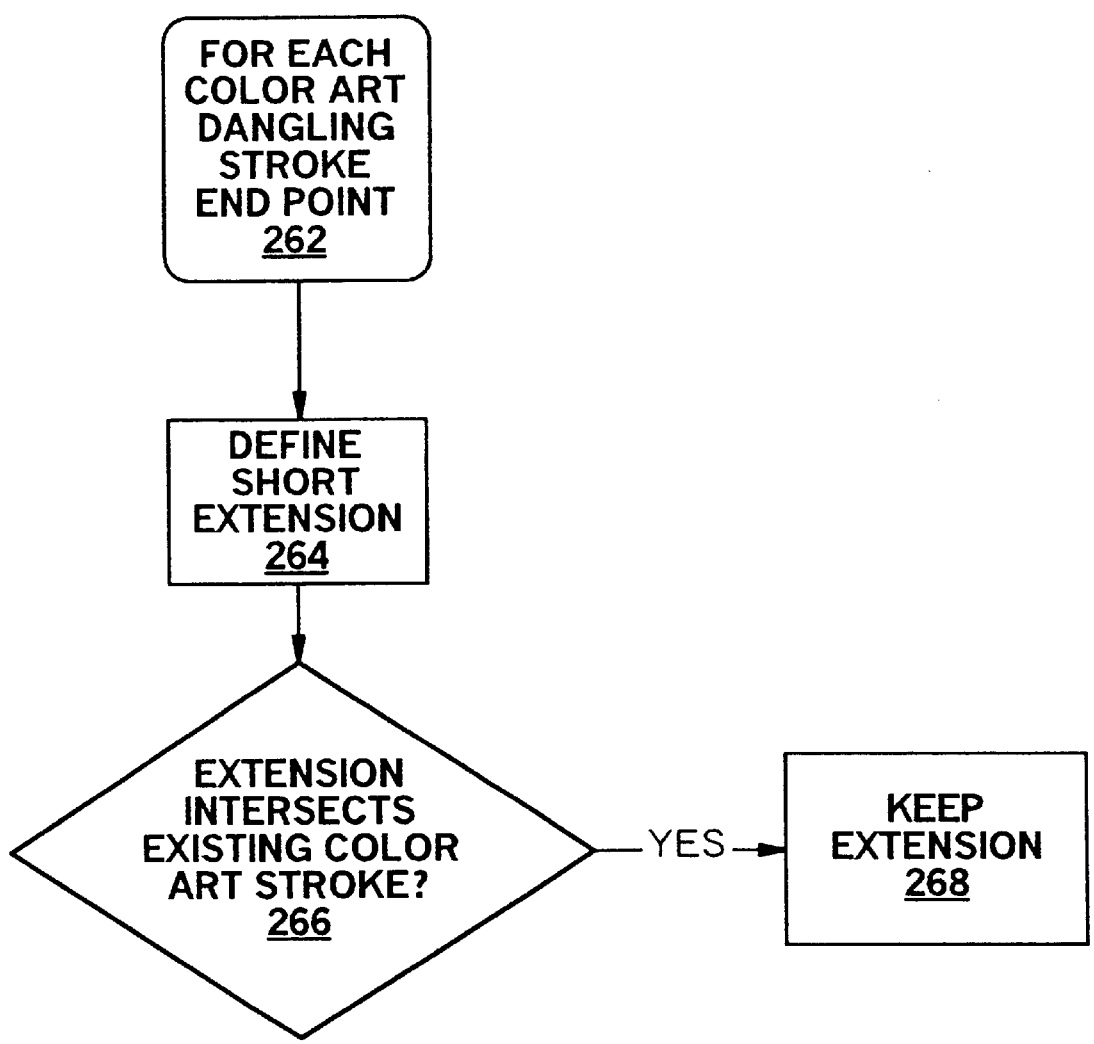
FIG._2L

DRAWING PIXMAP TO VECTOR CONVERSION

This Application is a Division of 08/520,914 filed Aug. 30,1995, U.S. Pat. No. 6,173,075.

BACKGROUND OF THE INVENTION

1. Field of the Invention

The invention relates to computer-based systems that scan hand-drawn drawings into a computer and process them. More particularly, it relates to systems that scan hand-drawn cartoon animation and prepare the scanned drawings for computer-performed processing, including inking, painting, and camera tasks.

2. Background

The traditional manual process for preparing cartoon animation begins with hand-drawn animation, typically pencil on paper. The drawings then go through a three-step process before they appear on film.

The first step is "ink". The lines of the pencil drawings are traced onto the front of clear plastic acetate sheets (called cels) with one or more colors of ink. If a completely black line is acceptable, the drawings are often photocopied onto the cel. In either case, the result is a solid, opaque line.

The second step is "paint". After the front of the cel is inked, the drawing is filled in on the back of the cel with various colors of paint.

The third step is "camera". All the painted cels for a particular frame are stacked and photographed to generate the final frame.

This traditional, three-step, manual process of inking and painting cels has a number of drawbacks. It is very labor intensive. It is difficult to avoid painting errors, such as painting a region the wrong color on one cel, and painting errors are time consuming to fix. It is very labor intensive to make a widespread color change. The cels are not completely transparent, so colors on lower cels in a final frame appear darker and desaturated. And a cel will get dusty and dirty, and that dirt appears visually in the final frame if the cel is not cleaned each time it is used.

In recent years, several computer-based systems have been developed to address the drawbacks of the manual ink-and-paint process. One such system is the USAnimation System, available from USAnimation, Inc. of Hollywood, Calif. Generally, such systems scan the original pencil drawings into the computer, and then perform the ink, paint, and camera tasks on the computer. The USAnimation product reduces the line art to vectors representing the center of the line art. These vectors—the "color art"—are found by pixel operations, using three separate copies of the image pixmap. With a drawing on standard 16 by 12 inch paper scanned at 300 dots per inch, the size of each pixmap exceeds 17 million bits. The line art polygons are then formed as a set of vector polygons, each polygon being formed around one unbroken, branchless section of the color art. The result of this process is illustrated in FIG. 1A, which shows a drawn "Y" digitized into a bitmap, and FIG. 1B, which shows the three regions of line art 102, 104, and 106 created by the USAnimation product from the bitmap of FIG. 1A.

Many such systems scan the pencil drawing as a pixmap with various levels of gray, so the scanned line has a soft edge. A "pixmap" is a data structure storing an image in pixel representation. A pixel is a picture element; if one thinks of a picture as a raster of points, a pixel is a point. In a pixmap, a pixel will have one or more bits of information, the number of bits being referred to as the "depth", which bits may represent gray scale or color information.

Generally, the lines of the pencil drawing in the pixmap are recolored to reflect the required ink color, and the appropriate regions of the pixmap are painted. Then, these digital cels are layered in the computer through a digital compositing process and written to an appropriate medium, such as video tape or film.

Such a digital process has a number of advantages over the manual process. It is less labor-intensive because computer paint programs allow for greater productivity than processes using physical ink and paint. Fixing paint errors on a computer is quick and easy. Widespread color changes in ink or paint can be implemented with minimal labor. Digital cels are completely transparent, so there are no problems with color shifts, and therefore no inherent limit in the complexity of the cartoon. Dirt specks picked up in the scanning process are easily eliminated from the digital cels and never reappear.

However, in such systems, a new set of issues arises and some old problems still exist.

First, the resolution of the pixmap is determined at scanning time. In order to avoid digital artifacts, it is necessary that the scanning resolution for a cel be as large, or larger than the output resolution multiplied by the most extreme truck (or amount of zoom in) for that cel.

Second, the effort and computer resources required to ink and to paint increase with the scanning resolution.

Third, painting errors are still difficult to prevent and detect. The pixmap for a digital cel is relatively large, requiring a significant amount of computers memory in the paint program. If there is not enough memory available to store more than a few cels at a time in the paint program's memory, it may be difficult to see the cartoon animate in order to detect painting errors.

And fourth, the ink may retain the variable density of the original pencil line in subsequent digital processing, a departure from the look of traditional animation.

SUMMARY OF THE INVENTION

In general, in one aspect, the invention provides a computer-implemented method for converting a pixmap representing a drawing into a set of vectors representing the drawing. The method includes forming or tracing closed loops of points or vectors around boundaries between edge and non-edge pixels in the pixmap; identifying each loop as defining an outer perimeter or as defining a hole associated with some particular outer perimeter; and for each outer perimeter, identifying as an ink art region an area defined by an outer perimeter minus any areas defined by any holes associated with the outer perimeter. In another aspect, then method includes creating a color art graph of vectors within an ink art region, the color art graph extending substantially to all extrema of the ink art region and separately enclosing all holes within the ink art region. In another aspect, the method includes creating a central ink art region at the join of a "Y" shape where a part of an ink art region forms such a shape. In another aspect, the central ink art region is formed by calculating the Delaunay triangulation of points defining the boundary of the ink art region and then defining the central ink art region as corresponding to a Delaunay triangle all of whose sides are interior to the original ink art region. In another aspect, the method includes closing gaps between dangling ends of the color art graph. In another aspect, the method includes extending a dangling end of the color art graph to join a nearby section of the same or a different color art graph. In another aspect, the method includes distinguishing loops by their clockwise or counterclockwise orientation. In another aspect, the method includes distinguishing loops by the signs of their areas.

In another aspect, the method includes creating a color art graph by creating a set of interior vectors and taking a non-end point of each interior vector as an end point to a color art vector within an ink art region. In another aspect, the method includes creating a pixmap by scanning a drawing into a computer with an optical scanner to obtain a scanned raster of pixels representing the drawing. In another aspect, the method includes removing pixels.

In another aspect, the method includes smoothing a closed loop and, in another aspect, doing the smoothing by moving end points of closed loop vectors toward a weighted average of their positions and their neighboring points' position. In another aspect, the method includes means for filtering vectors by replacing sequential and approximately colinear vectors with a resultant vector.

In another aspect, the method includes smoothing a color art graph, including, in another aspect, smoothing by moving points of color art vectors toward a weighted average of their positions and their neighboring points positions. In another aspect, the vectors of the closed loops are straight line segments. In another aspect, the color art vectors are straight line segments.

In another aspect, the method includes creating closed loops by considering the pixels of the image in a scan order, the present pixel in the scan order being called the scan pixel, and for each scan pixel performing the following steps: if the scan pixel is not an edge pixel, advancing to the next pixel in the scan order as the scan pixel and repeating this edge-pixel test, or if the scan order is exhausted, terminating;the process of creating closed loops; taking the scan pixel as the current pixel and beginning a stroke; finding the direction of the counterclockwise-most white neighbor of the current pixel beginning from an initial direction; selecting as the edge direction the direction resulting from one step counterclockwise from the direction found in the preceding steps; marking the current pixel as not being an edge and ask being visited in general; marking the current pixel as visited from the edge direction; turning the edge direction one step clockwise; if the neighbor pixel and the edge direction is white, adding a vector connecting the current pixel and the white neighbor pixel to the tail end of the stoke, or if the neighbor pixel in the edge direction is not an edge pixel and has not been marked as visited, or if the neighbor pixel in the edge direction has not been marked as visited, making the neighbor pixel the current pixel and turning the edge direction 180°, and in all three cases looping back to the step of marking the current pixel as not an edge pixel and as visited in general; connecting the ends of the stroke to form a closed loop; and adding the closed loop to the end of a loop list.

In another aspect, the method includes the following steps for building an ink art region: picking the first (or next) loop in the loop list as the current list; computing the signed area defined by the current loop and, if the area is positive, adding the current loop to the tail end of an ink art list as an ink art region, or otherwise, marking the current loop as a hole and searching the ink art list from its beginning for the first ink art region that contains any point of the current loop and adding the current loop of the hole to the found, first ink art region.

In general, in another aspect, the invention provides a system for converting a drawing represented in a pixmap of pixels into a vector representation of the drawing. The system includes means for forming closed loops of edge vectors following the boundaries between edge pixels and non-edge pixels; means for building ink art regions from loops so that each ink art region is a continuous region enclosed by edge vectors; means for finding nearest neighbors among a set of boundary points of the ink art regions and linking them with link segments; and means for identifying those link segments between nearest neighbors that pass through the interior of one of the ink art regions (which link segments are designated interior links). In another aspect, the system includes means for creating a color art graph by tracing a connection from an interior point of one interior link of an ink art region to its neighboring interior links or the same ink art region to define a color art vector of the color art graph. In another aspect, the system includes means for removing dirt pixels.

In another aspect, the system includes means for filtering superfluous boundary points from the boundary of ink art regions or superfluous points from color art graphs; means for extending a color art graph to close gaps between dangling ends; means for extending a color art graph to join at dangling ends to a nearby section of the same or different color art graph; means for removing registration holes from the pixmap; and means for translating, resizing, and rotating color art graphs and ink art regions.

In another aspect, the method and system include using midpoints of link segments joining inside and outside boundary points as points defining color art vectors.

In general, in another aspect, the invention features a method for converting a pixmap representing a drawing into a geometric point-based representation of the drawing by means of the features recited above. In another aspect, the method includes calculating nearest-neighbor vectors joining nearest-neighbors among those points that At define an ink art region; identifying those nearest-neighbor vectors that lie interior of the ink art region; and identifying as a location to break the line art region the location of an interior nearest-neighbor vector that has, at each end of itself, a nearest-neighbor vector connected to itself and lying on the same side of itself. In another aspect, the method includes distinguishing at least two colors of non-white pixels (with may be called red and black) and, after they are used in creating color art graphs, distinguishing any closed loops formed by tracing red pixels from any closed loops formed by tracing black pixels.

The invention has a number of advantages.

For example, the vector representation is resolution independent. This means that it can be scaled to virtually arbitrary size without the appearance of digital artifacts. When the input to an ink and paint process is such a vector representation, the final output resolution does not have to be predetermined.

Also, because of the resolution independence, the speed of inking and painting is largely independent of the output resolution.

Also, the vector representation is more compact than an equivalent pixmap representation. This allows a paint application employing the invention to load dozens of cels simultaneously and flip through them fast enough to allow viewing of the animation. This allows the operator to prevent nearly all errors in the ink and paint stages of production.

Also, the vector representation provides an accurate duplication of the opaque qualities of a traditional, hand-inked line.

Also, the nuances of the artist's original pencil line may be replicated and preserved, with the same (or better) quality than would be produced by a traditional hand-inker or by a photocopy machine. This includes a great deal of detail, such as the variable thickness of lines.

Also, two vector representations of the drawing are produced, one for the ink (line art) and one for the paint (color art). The color art vectors describe regions for paint that extend underneath the bounding line art. Also, by first creating a line art vector representation, and then color art vectors from the line art vectors, the amount of time a large pixmap must be kept in program memory is reduced.

Also, vector ink is broken at natural locations for color changes, such as the joints between lines. This helps to automate the process of inking, because the operator does not have to manually specify all the boundaries between ink colors.

Also, complex drawings in the invention do not lead to serious performance degradation.

Also, the invention is robust in the sense that it can handle a wide range of input cases, and the output accurately reflects the input image with little or no manual intervention.

Also, the vectors may be used to resize and/or rotate a pixmap with little loss of quality. The pixmap is vectorized and the vector representation is resized and/or rotated and then converted back to a pixmap by rendering the vector polygons, optionally with anti-aliasing.

Also, the vector representation may be used to improve the quality of the image by anti-aliasing, by taking the vectorized pix map and converting it back to an image pixmap by rendering the vector polygons with anti-aliasing. Also, the vector representation may be used for the purpose of compression of data.

Also, the vector representation may be used for image comparison and matching of corresponding parts of similar images. By geometric analysis of the vector representation of an image, comparison of two or more images to identify a corresponding part of successive images is performed and corresponding regions may be identified to be painted automatically.

Other advantages and features will become apparent from the following description and from the claims.

BRIEF DESCRIPTION OF THE DRAWINGS

The accompanying drawings, which are incorporated in, and constitute a part of, the specification, schematically illustrate specific embodiments of the invention and, together with the general description given above and the detailed description of the embodiments given below, serve to explain the principles of the invention.

FIGS. 2A–2H and 2J–2L are a flow chart of a process for generating line art and color art from a pixmap.

DETAILED DESCRIPTION

Figure 1A:
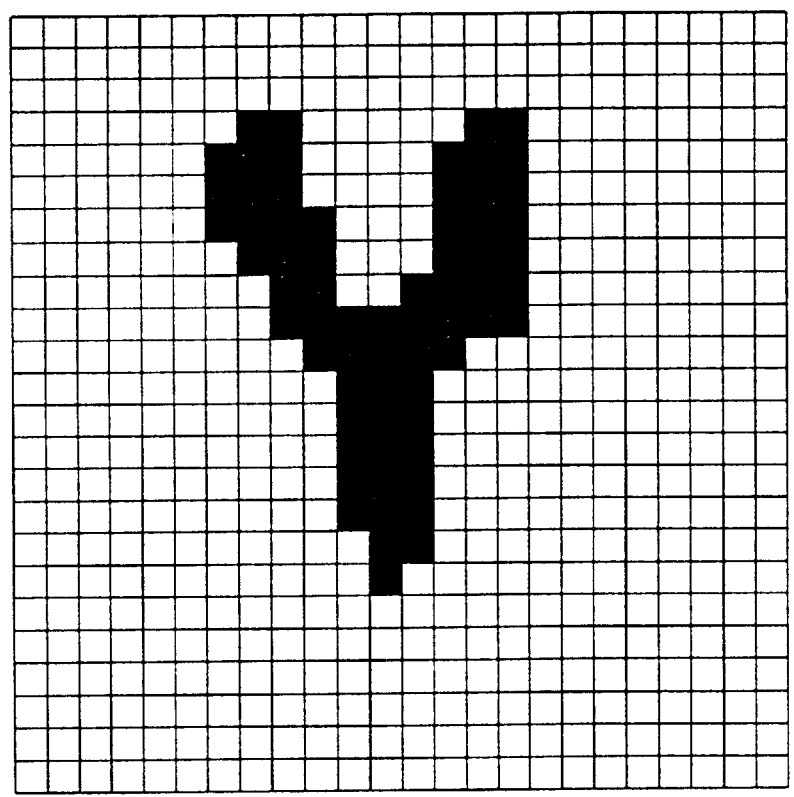
FIGS. 1A and 1B illustrate the line art produced by a prior art system.
Figure 1B:
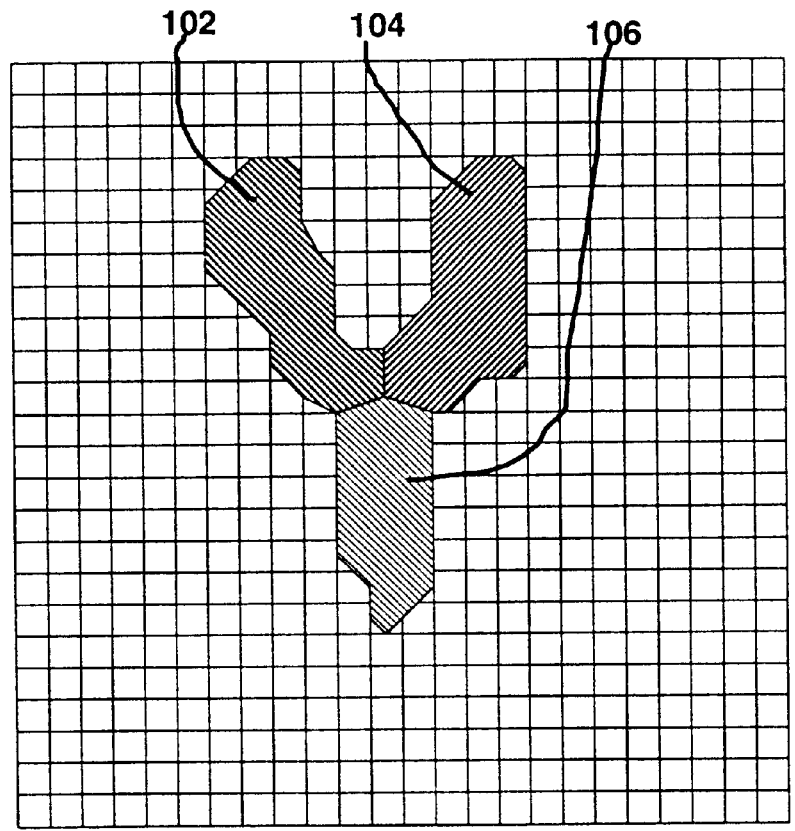

The processes described below may be performed on any appropriate hardware platform, such as a workstation-class computer of the kind offered by, for example, Hewlett-Packard, Sun, and Silicon Graphics; however, both smaller and larger computers could be used. A full hardware configuration would typically include a large RAM and disk storage configuration for pixmaps, a scanner, possibly a color scanner, for scanning (digitizing) drawings, a color calibrated monitor, and user interface input devices such as a keyboard and a mouse.

Turning to FIG. 2A, a process for extracting a vector representation of an image from a two dimensional pixmap representing the image begins with step 110 of scanning the image. At this step, additional information may be obtained regarding the registration (translation or rotation) of the image that should be performed the final vector representation is produced. If the drawings being scanned are on pegged paper, for example, the program and the scanning step 110 can find the peg holes and calculate registration information based on the position of the holes in the scanned image. After vectorization, this information can be used to correctly position the final vector representation.

At step 120, the scanned image is converted to a bitmap. Turning to FIG. 2B, if the image contains color information, decision step 122, the colors are converted to gray scale at step 124. Otherwise, at step 128, if the image contains gray scale, it is converted to black and white at step 126. At the end of step 120, the image is a bitmap, that is, a one bit pixmap representing the drawing as a black and white raster. Step 124, converting colors to gray scale, may be implemented by first converting the colors to RGB color space and then converting to gray scale using color weights of, for example, red=0.30, green=0.59, and blue=0.11. The conversion to black and white from gray at step 126 may be done simply by applying a threshold, such as setting to black all pixels that are at least 50% gray. Other values could-be used, both for the threshold and for the color weight conversion.

Figure 3A:
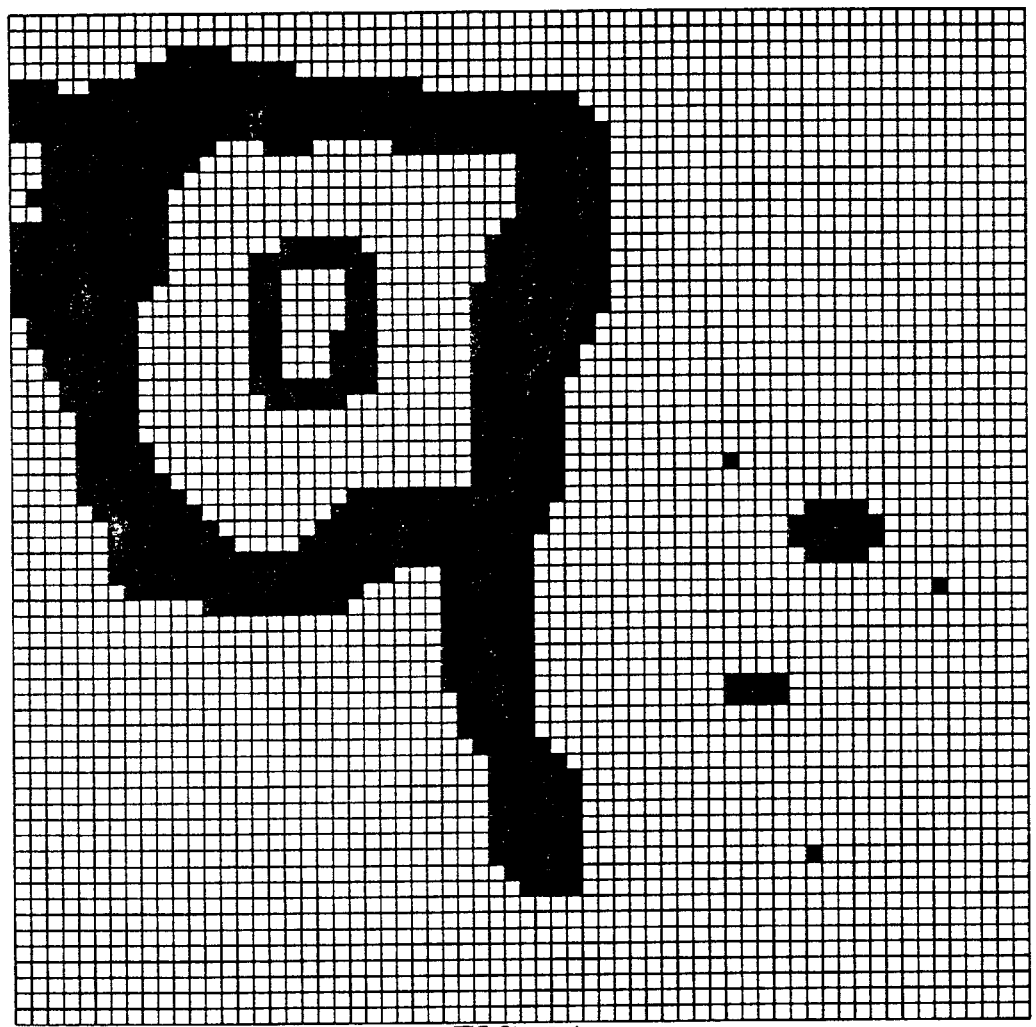
FIG. 3A illustrates a pixmap one bit deep.
Figure 3B:
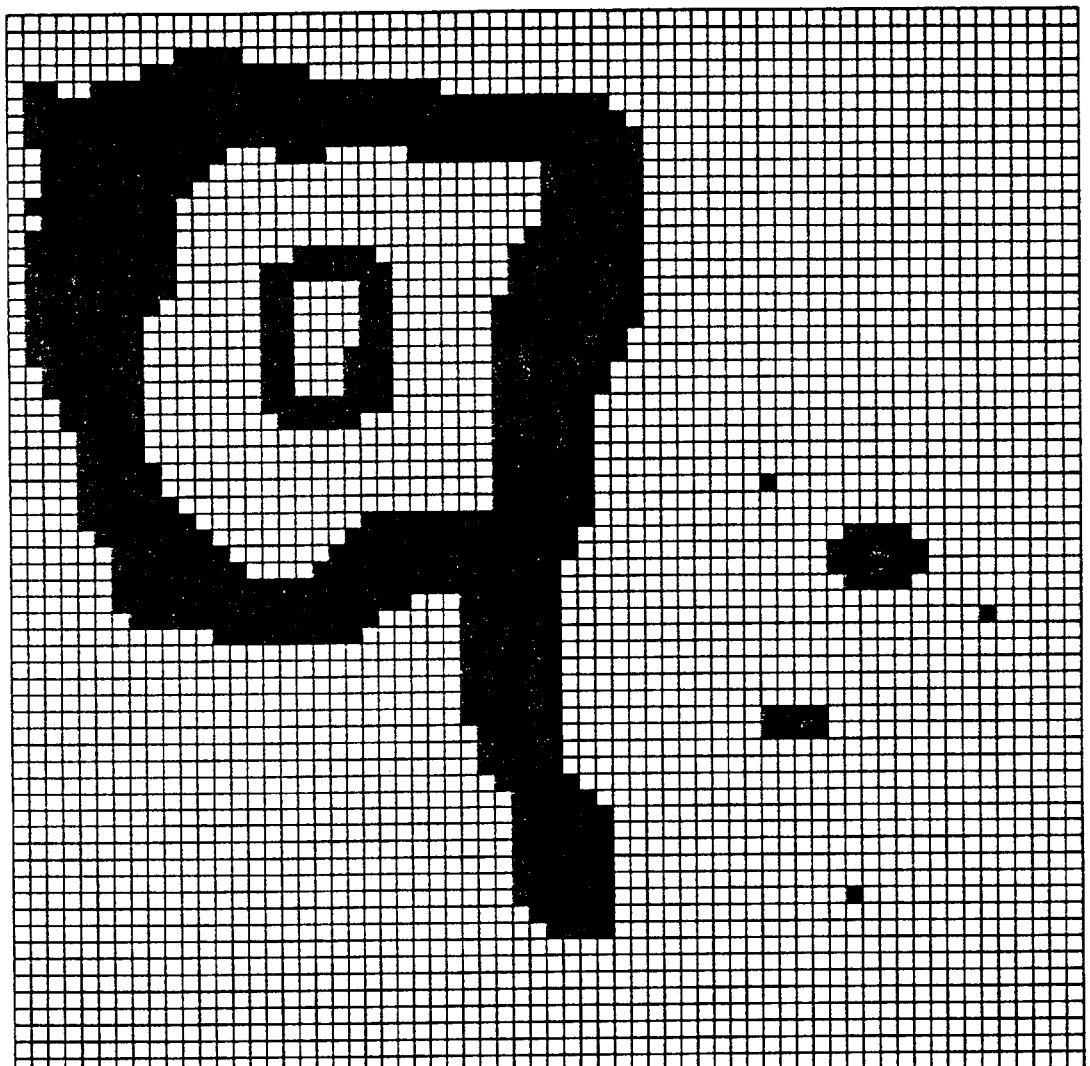
FIG. 3B illustrates the pixmap of FIG. 3A with the border pixels made white.

An optional step 130, the bitmap produced at step 120 is preprocessed to simplify boundary conditions and to minimize "dirt" (small areas of black introduced in the scanning process). Turning to FIG. 2C, further processing is simplified if all border pixels of the bitmap are made white, at step 132. FIG. 3A illustrates a bitmap image before step 132. FIG. 3B illustrates a bitmap image after the border pixels have been written in white at step 132. In these and the other figures, each square represents one pixel, either black or white, in the bitmap.

Figure 3C:
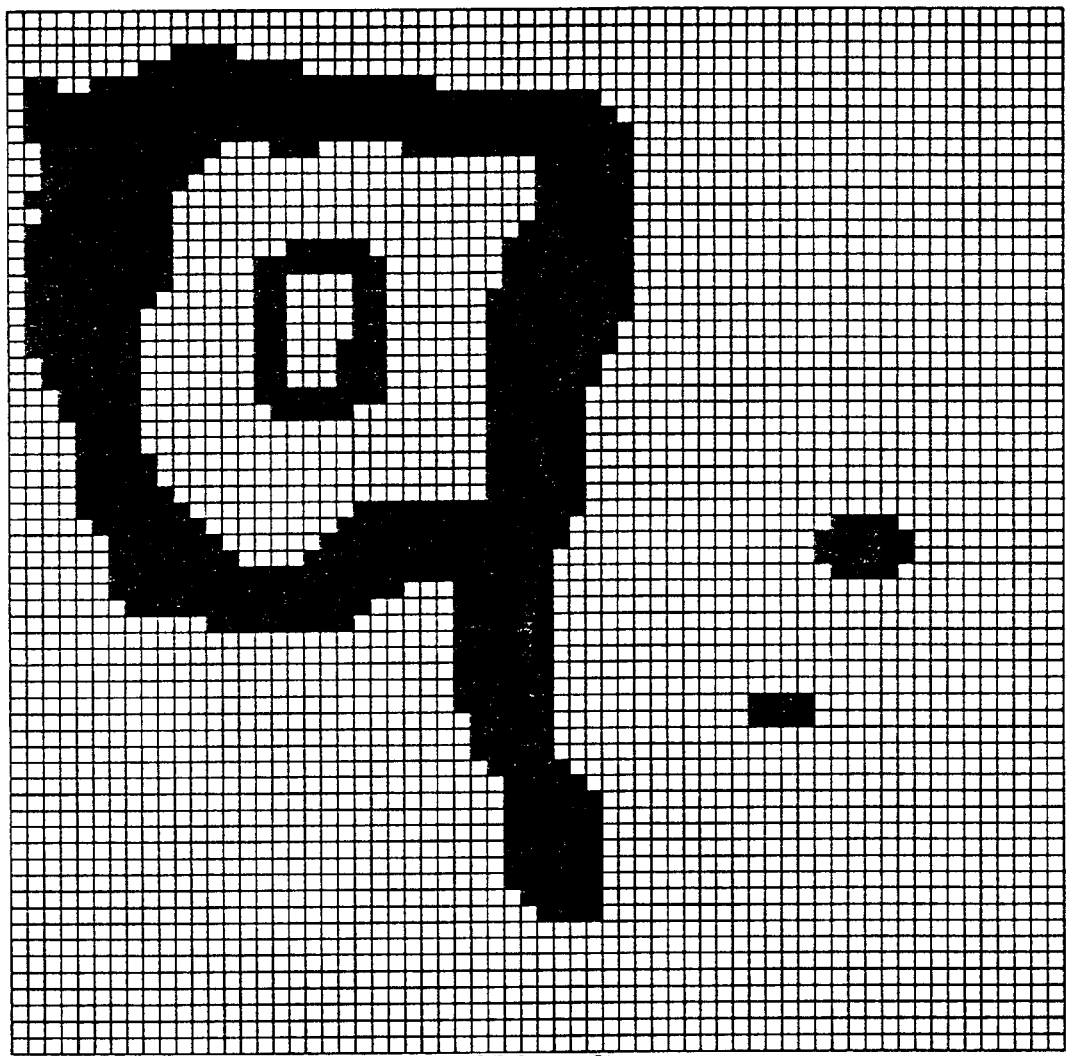
FIG. 3C illustrates the pixmap of FIG. 3B with "dirt" pixels changed to white.

The preprocessing of step 130 may also include minimizing dirt. At step 136, the process advances to the first (or next) pixel of the bitmap. If the pixel is black, decision step 134, and none of its four-neighbors are black, decision step 137, the pixel is made white, step 138, and at step 136 the process advances to the next pixel. If the current pixel is not black at decision step 134, the process returns to step 136, advancing to the last pixel, until the last pixel has been considered. At step 137, in alternative embodiments, rather than considering the four-neighbors (the neighbors above, below, to the left, and to right, of the current pixel) diagonal pixels are also considered, or only diagonal pixels are considered. FIG. 3C illustrates the bitmap of FIG. 3B after the dirt pixels have been changed to white using the four-neighbor test at step 137.

Figure 3D:
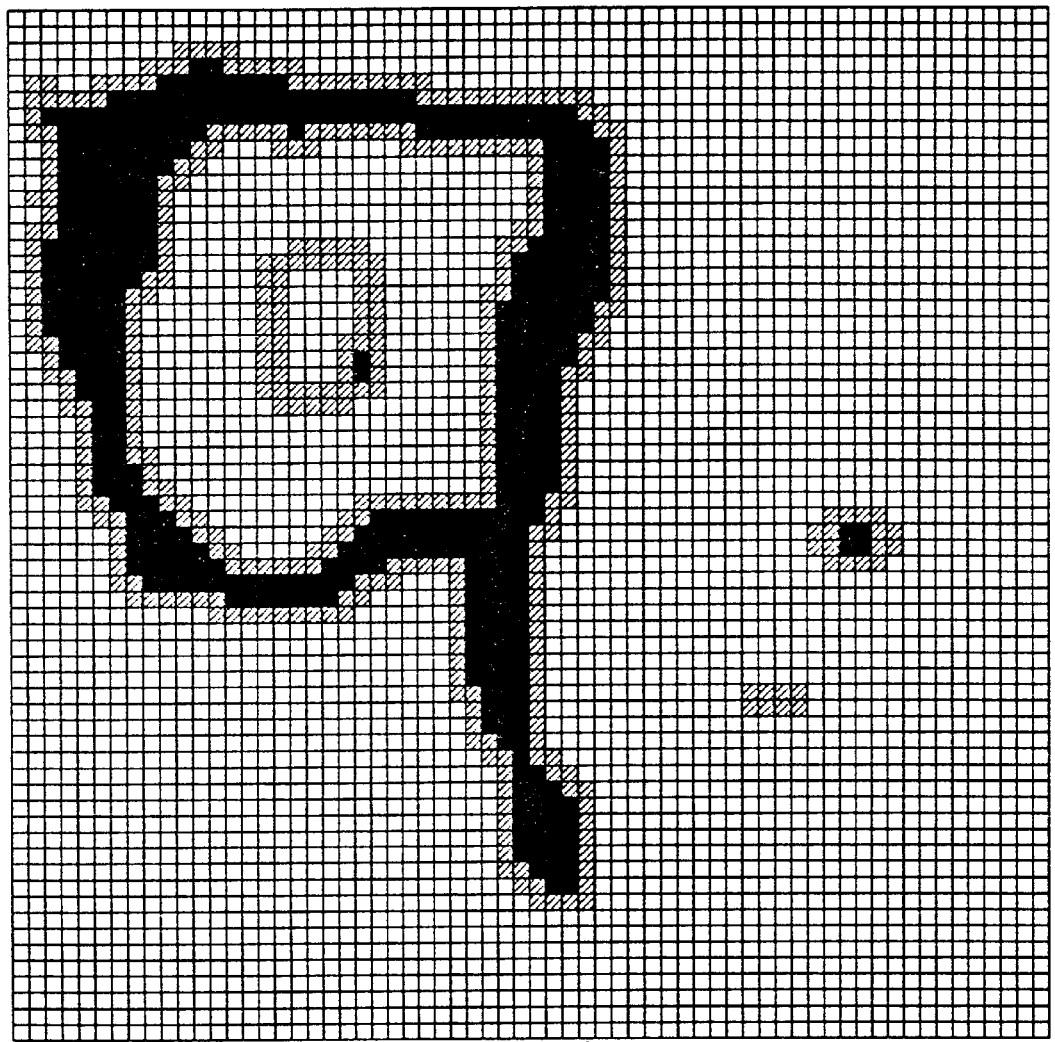
FIG. 3D is FIG. 3C with the pixels considered "edge" pixels shown in a crosshatch.

Returning to FIG. 2A, at step 140 all pixels that are black and have at least one white eight-neighbor are marked as edge pixels. In FIG. 3D, the edge pixels of FIG. 3C are illustrated as cross-hatched pixels.

Return to FIG. 2A, at step 150, strokes are formed. A stroke is a connected sequence of vectors (conventionally, line segments, which in some embodiments are thought of as having a direction), or equivalently, a sequence of points. A stroke that follows a line art boundary normally defines a contour loop, that is, a sequence of points (vectors) that loops back on itself, as illustrated in FIG. 2F, which illustrates the boundary contours, in the forms of polygons defining the inside and outside boundaries of line art, produced by the process that will now be described.

Turning to FIG. 2D, the process of defining boundary contours involves two basic loops. In the first loop, all of the pixels of the bitmap are scanned in some regular order. In the process as illustrated in FIG. 2D, the process begins with the upper left pixel in the bitmap, step 151, and pixels are taken in scan line order, step 152, until the last pixel has been considered and the process exits at step 153. If the current pixel, step 154, is an edge pixel, decision step 155, the process begins a new contour (or edge chain) with a new stroke at step 510. It will be readily understood that the scanning of pixels in steps 151 through 155 may be done in any regular order, but it is convenient if the order is such that the outside edge of a piece of line art is always encountered before its inside edge.

Figure 4A:
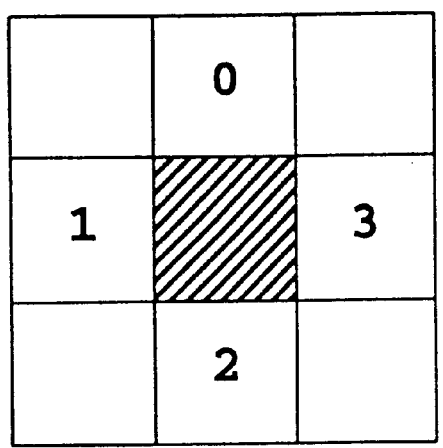
FIGS. 4A–4AQ are a sequence of figures illustrating a process of tracing a stroke.
Figure 4B:
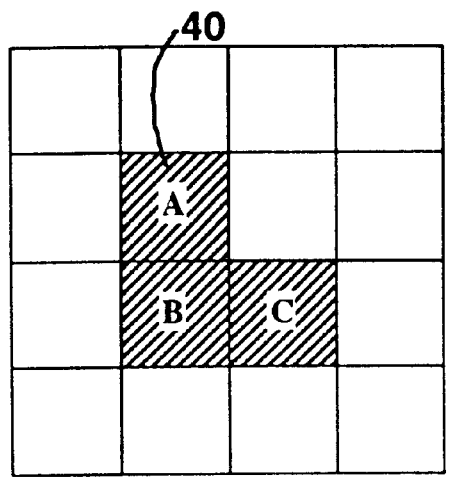

In the process to be described, one of the pixels will be taken as the current pixel. Other pixels are identified by their position with respect to the current pixel. As illustrated in FIG. 4A, direction 0 is above the current pixel; direction 1 to the left; direction 2, below; direction 3 to the right. FIG. 4B illustrates a three-pixel image that will be used to illustrate the process. The first current pixel at step 510 is the uppermost black pixel (pixel A 40) in FIG. 4B.

Having a current edge pixel, the process finds the direction of the counterclockwise-most white four-neighbor at step 512. A simple process for finding the desired direction is set forth in the following pseudo code. In this pseudo code, a reference to pixel n refers to the pixel in direction n (per FIG. 4A) from the current pixel.

Figure 4C:
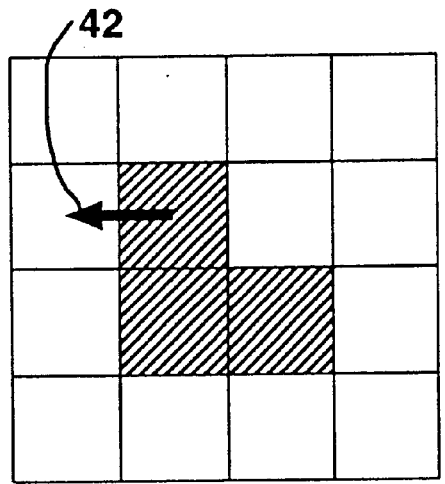

IF (pixel 0 is white)
   IF (pixel 1 is not white) direction=0;
   ELSE if (pixel 2 is not white) direction=1;
   ELSE if (pixel 3 is not white) direction=2;
ELSE IF (pixel 1 is white)
   IF (pixel 2 is not white) direction=1;
   ELSE IF (pixel 3 is not white) direction=2;
   ELSE IF (pixel 0 is not white) direction=3;
ELSE IF (pixel 2 is white)
   IF (pixel 3 is not white) direction=2;
   ELSE IF (pixel 0 is not white) direction=3;
   ELSE IF (pixel 1 is not white) direction=0;
ELSE IF (pixel 3 is white)
   IF (pixel 0 is not white) direction=3;
   ELSE IF (pixel 3 is not white) direction=0;
   ELSE IF (pixel 2 is not white) direction=1;

The result of this step 512 is illustrated, for example, in FIG. 4C, where the base of the arrow 42 is in the current pixel and the arrow (which indicates the direction) points in the direction of the counterclockwise-most white neighbor.

Figure 4D:
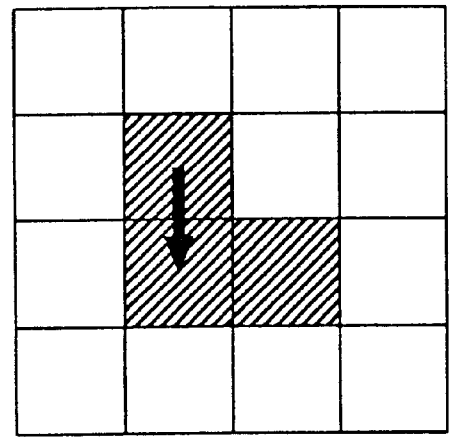

At step 514, the direction is turned 90 degrees counter-clockwise. This makes a direction point to a non-white neighbor. In pseudo code:

IF (direction is 0) direction=1;
   ELSE IF (direction is 1) direction=2;
   ELSE IF (direction is 2) direction=3;
   ELSE IF (direction is 3) direction=0;

The result of this step 514 is illustrated, for example, in FIG. 4D, where the orientation of the direction arrow shows the direction has been turned 90 degrees counterclockwise.

At step 516, if the current pixel is marked as an edge, it is marked as not an edge to prevent beginning a trace with this pixel if this pixel becomes the current pixel in the scan line order. Also, at step 516, if the current pixel is not marked as visited, it is marked as visited in general. This is illustrated, for example, in FIG. 4E, where the white box 44 in the center of the current pixel indicates that the pixel is marked as visited in general.

At step 518, the current pixel is also marked as visited from the current direction. This is illustrated, for example, in FIG. 4F, where the box 45 on the 2 edge of the current pixel (the edge in the 2 direction) indicates that the current pixel is visited from direction 2.

Figure 4E:
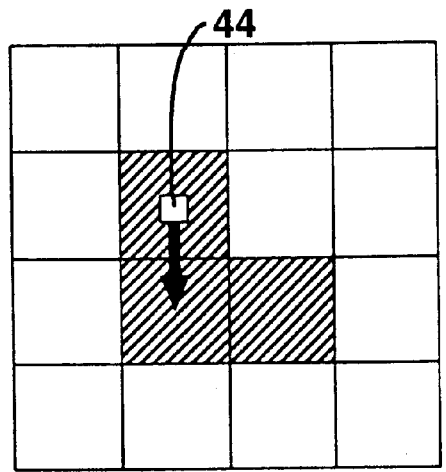
Figure 4F:
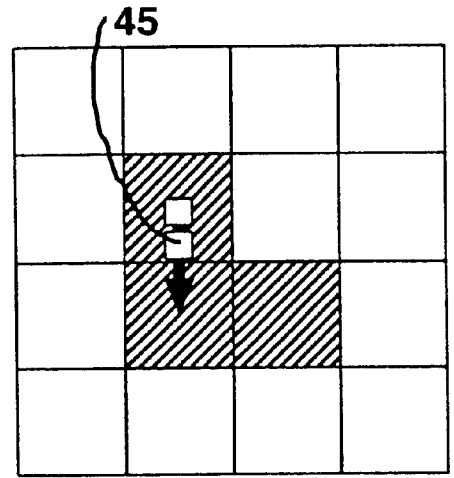
Figure 4G:
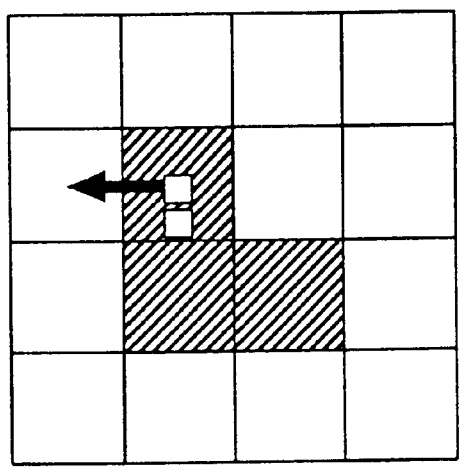

At step 520, direction is turned 90 degrees clockwise, as illustrated, for example, in FIG. 4G.

Figure 4H:
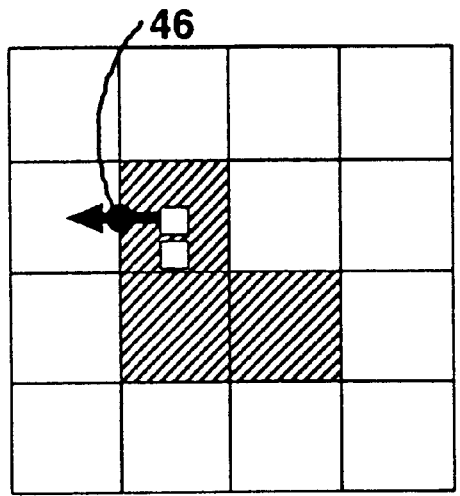

As decision step 522, if the neighbor in the current direction is white, the midpoint of the line segment separating the two pixels, illustrated by a black dot 46 in FIG. 4H, is added to the tail of contour or stroke that represents the current edge chain. Otherwise, at decision step 522, if the neighbor in the current direction is not white, then at decision step 526, if the neighbor in the current direction is neither marked as an edge pixel or as having been visited, then the process returns to step 516. Otherwise, at decision step 526, the process proceeds to decision step 528. If the neighbor pixel in the current direction is marked as being visited from the current pixel, all of the points on the edge chain have been found and they may be connected to form a contour boundary step 540. The condition at decision step 528 in which the process proceeds to step 540 is illustrated in FIG. 4AP.

Figure 4I:
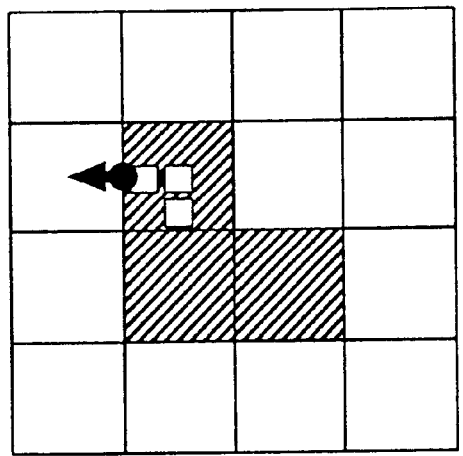
Figure 4J:
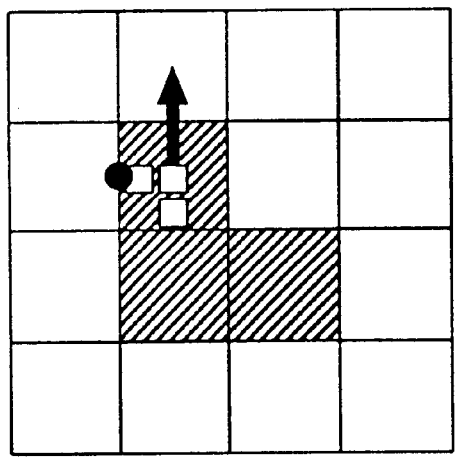
Figure 4K:
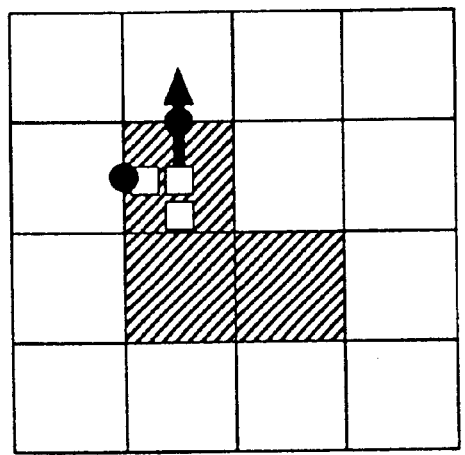
Figure 4L:
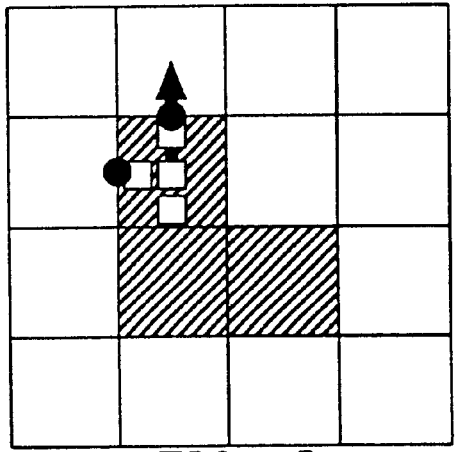
Figure 4M:
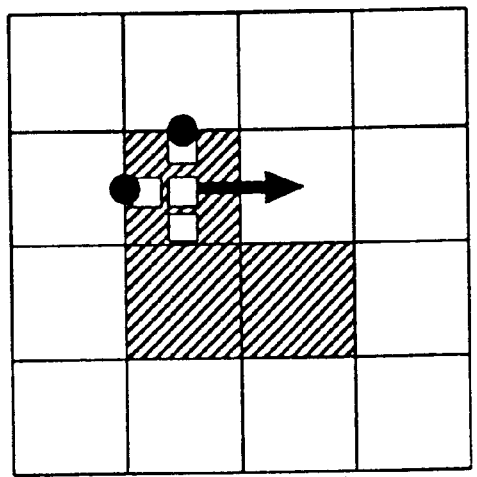
Figure 4N:
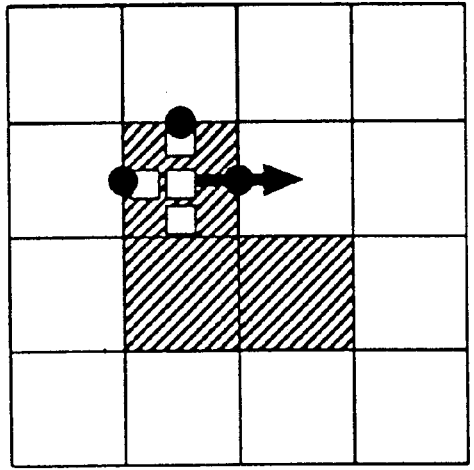
Figure 4O:
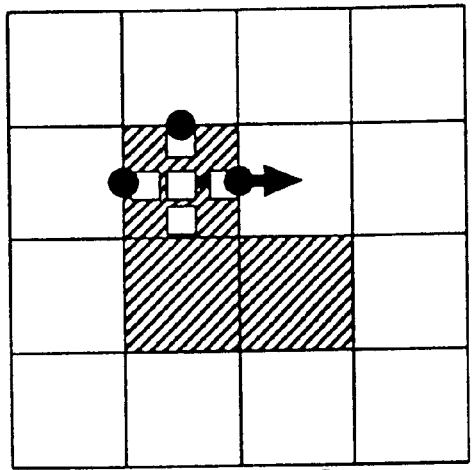
Figure 4P:
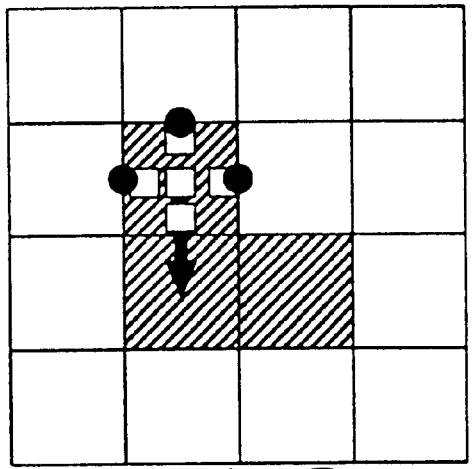
Figure 4Q:
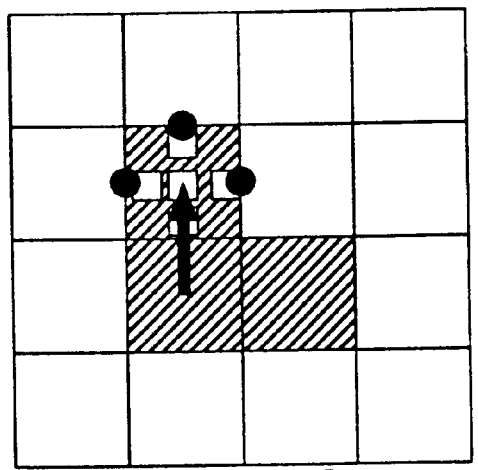

If, on the other hand, at decision step 528 the neighbor is not marked as being visited from the current direction, the neighbor becomes the current pixel at step 530, and the current direction is turned 180 degrees, step 532, both as illustrated in FIG. 4Q. The process continues at step 516 with the (new) current pixel being marked as not an edge and visited in general. The new current pixel is illustrated as marked as visited in general in FIG. 4R.

Figure 3E:
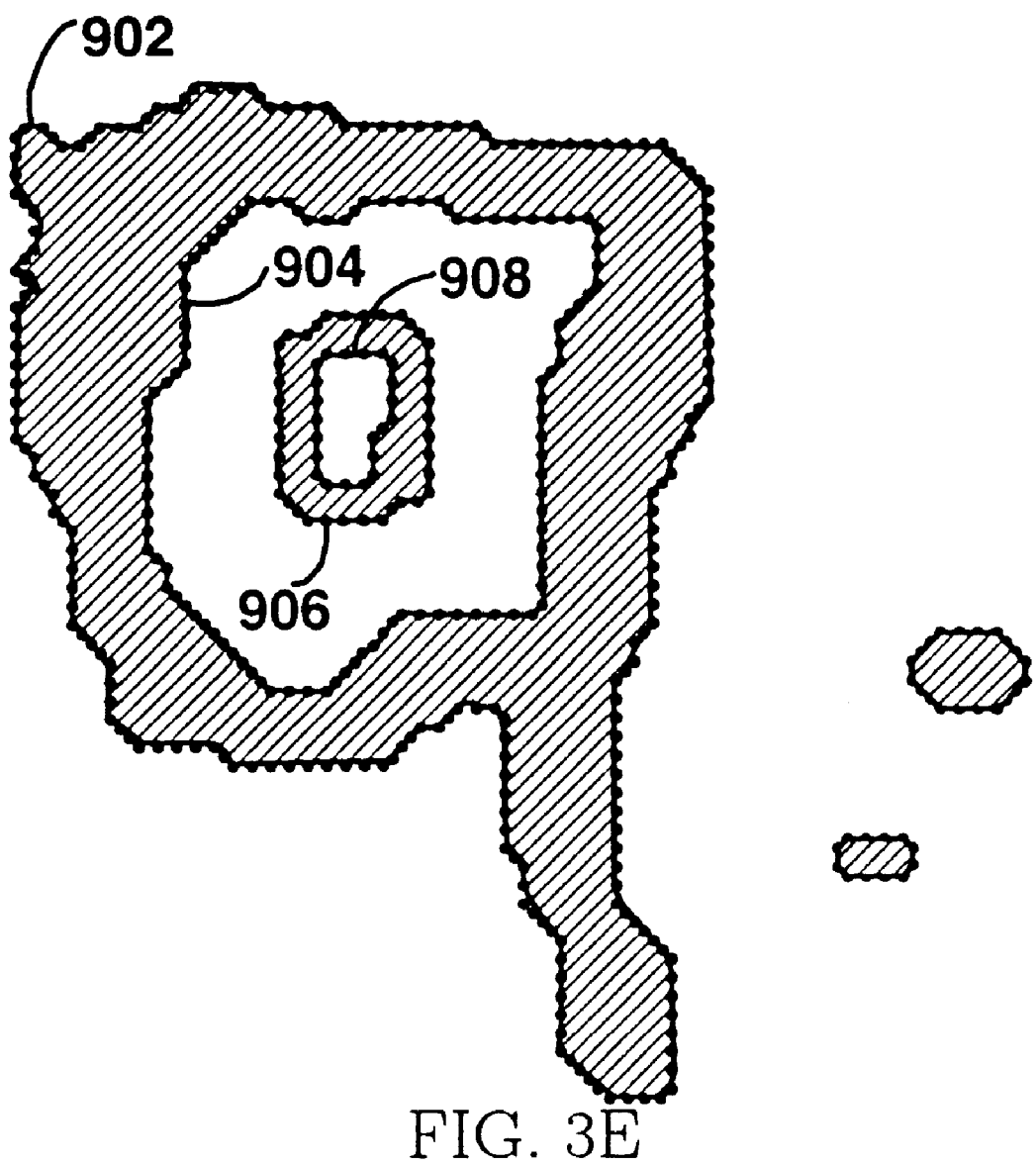
FIG. 3E illustrates strokes traced around the edge of the pixels of FIG. 3D.

As has been mentioned, when the process reaches step 540, all of the points defining the boundary contour have been found, and they are connected at step 540 to form a closed loop or contour, as illustrated, for example, in FIG. 4AQ and in FIG. 3E. After step 540, the contour is added to a stroke list at step 542, and the process returns to the scanning of pixels in the bitmap at step 152.

A stroke, or a contour loop, is stored as an ordered sequence of points which, at this stage of processing, always loops back on itself. The stroke list stores all of the strokes. For convenience, both the strokes and the stroke list may be stored as a doubly-linked list. Note that the stroke loop is formed in either a clockwise or a counterclockwise orientation. Although either choice would work equally well, in the process described here, a loop formed in the counter-clockwise direction is an outside contour, and one formed in a clockwise direction, an inside contour (i.e., one that defines a hole).

The process just described will now be illustrated by application to the simplified piece of line art illustrated in FIG. 4E. The line art is made up of three black pixels designated A, B, and C.

Figure 4R:
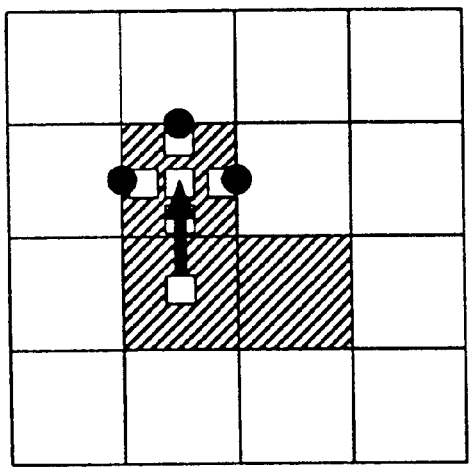
Figure 4S:
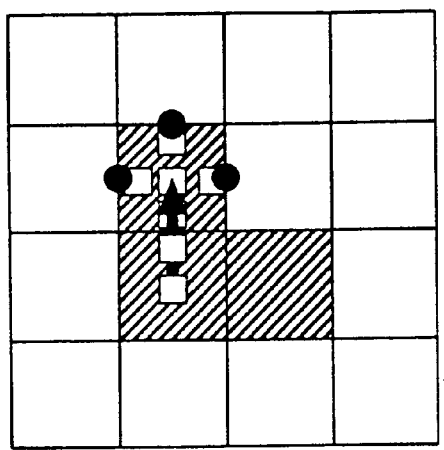
Figure 4T:
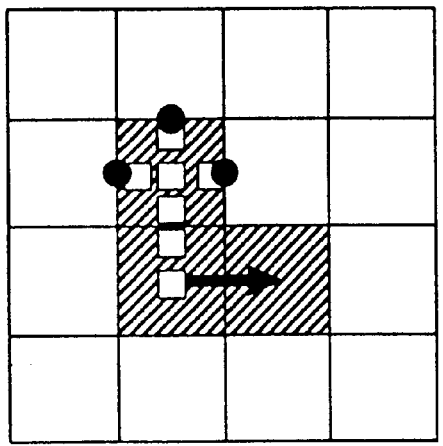
Figure 4U:
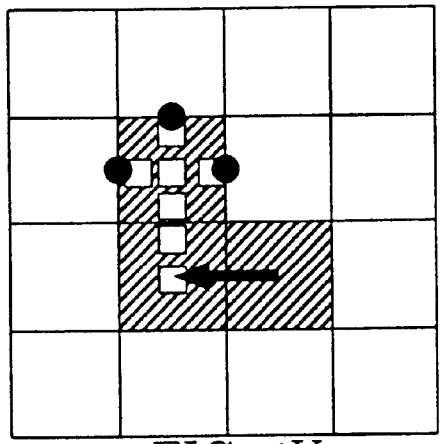
Figure 4V:
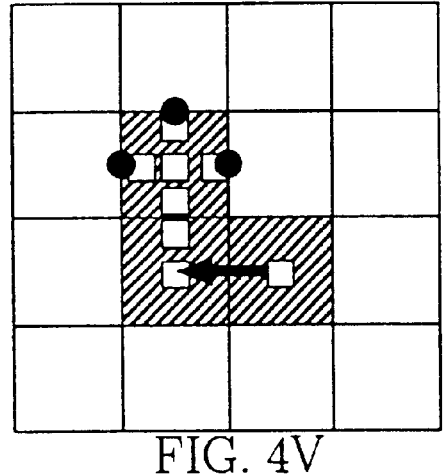
Figure 4W:
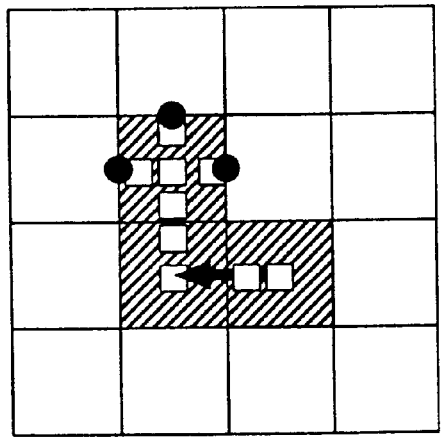
Figure 4X:
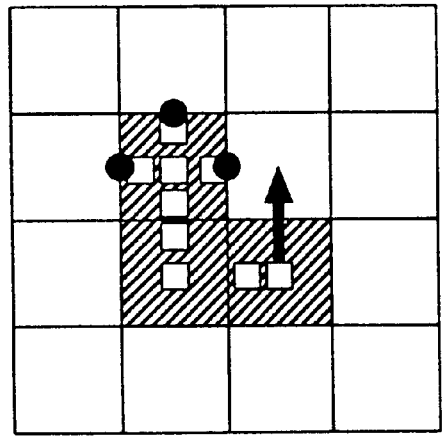
Figure 4Y:
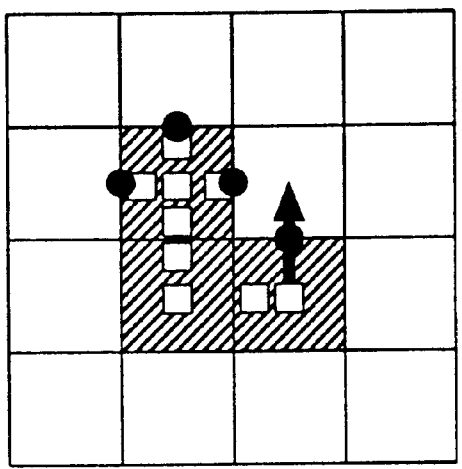
Figure 4Z:
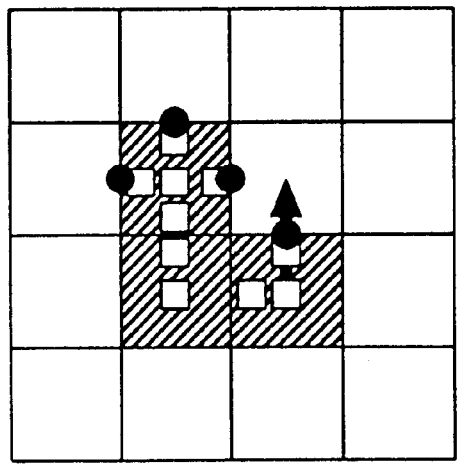
Figure 4A:
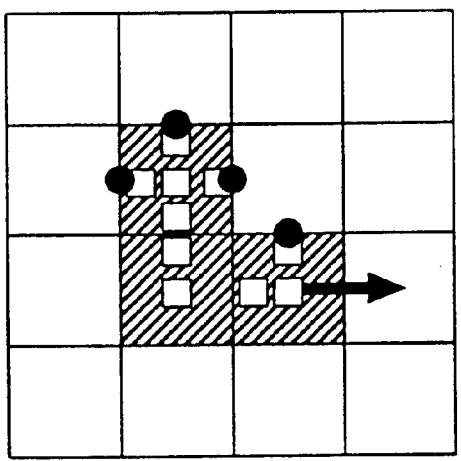
Figure 4A:
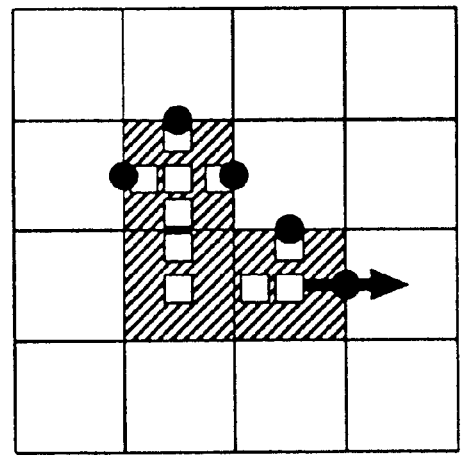
Figure 4A:
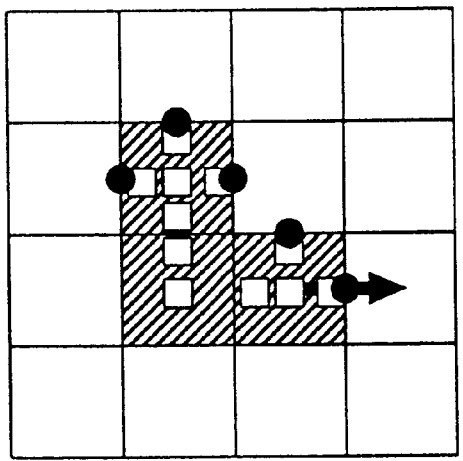
Figure 4A:
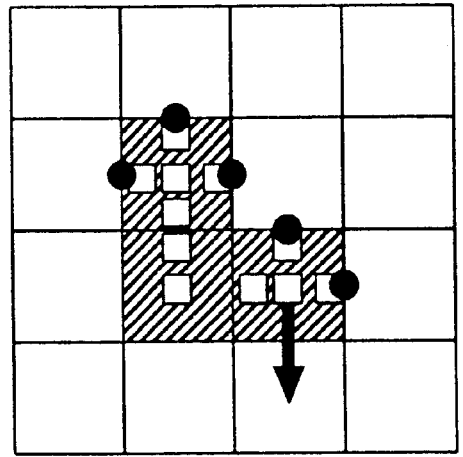
Figure 4A:
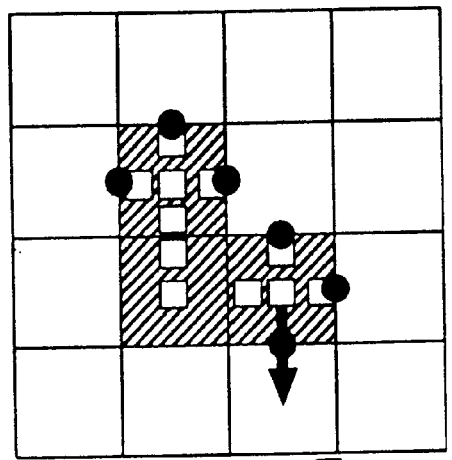
Figure 4A:
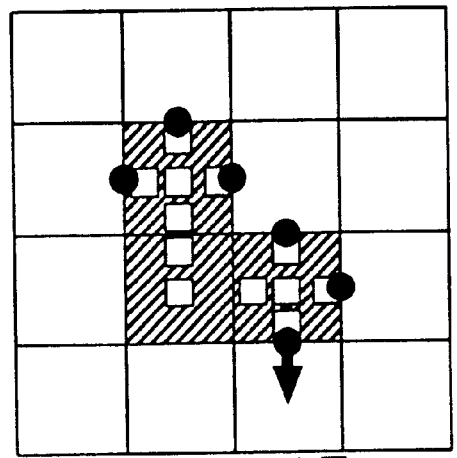
Figure 4A:
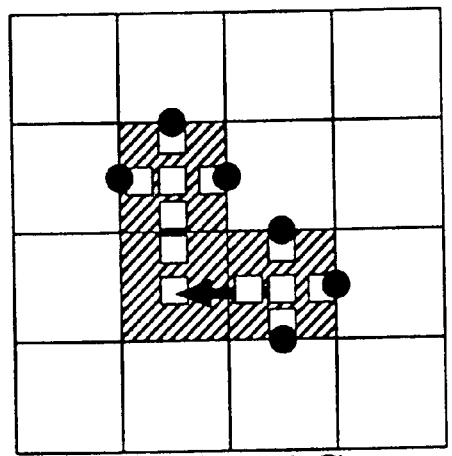
Figure 4A:
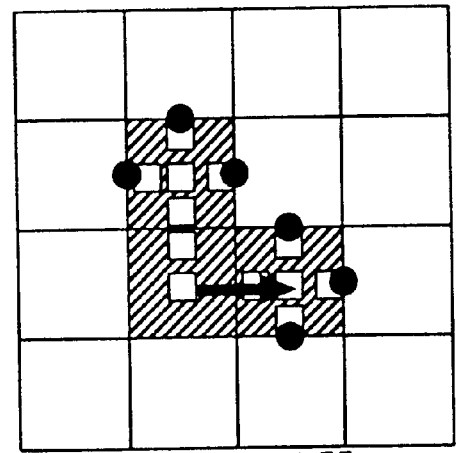
Figure 4A:
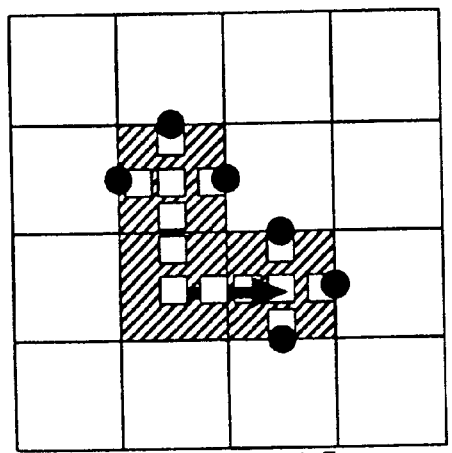
Figure 4A:
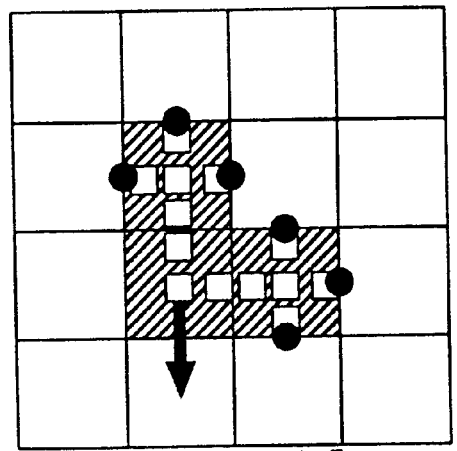
Figure 4A:
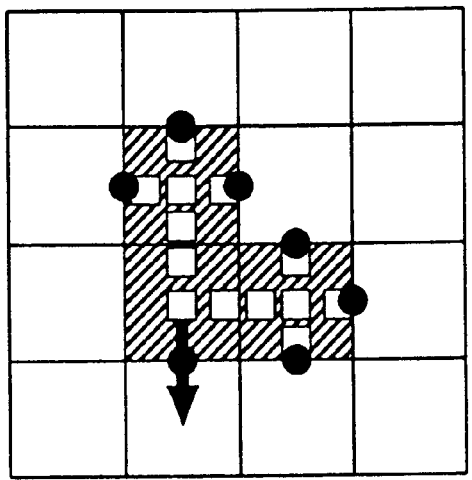
Figure 4A:
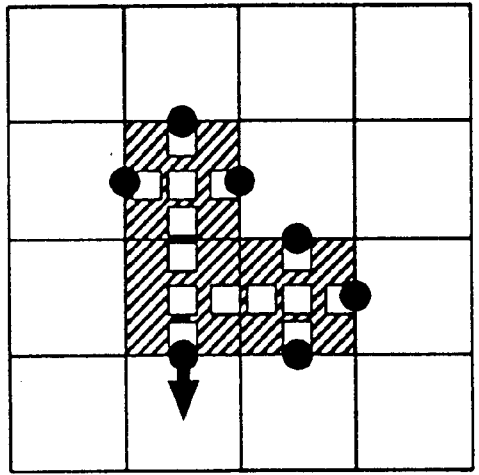
Figure 4A:
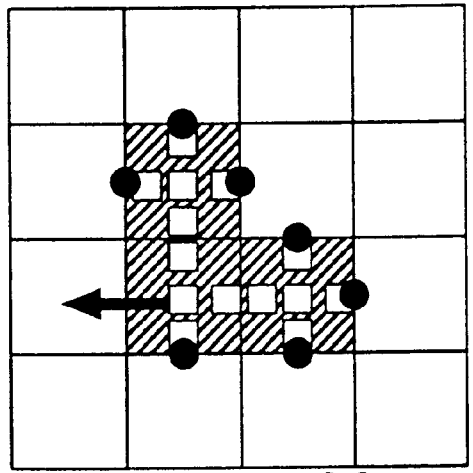
Figure 4A:
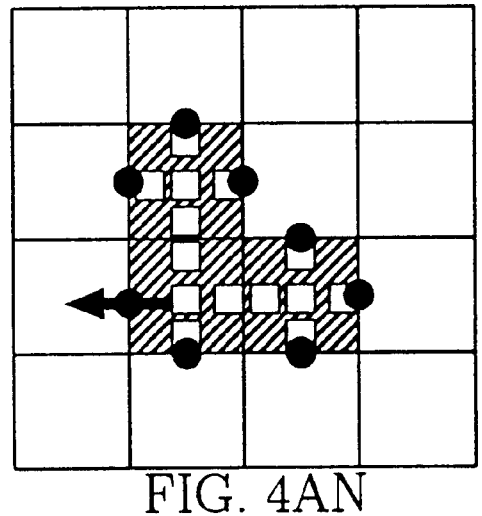
Figure 4A:
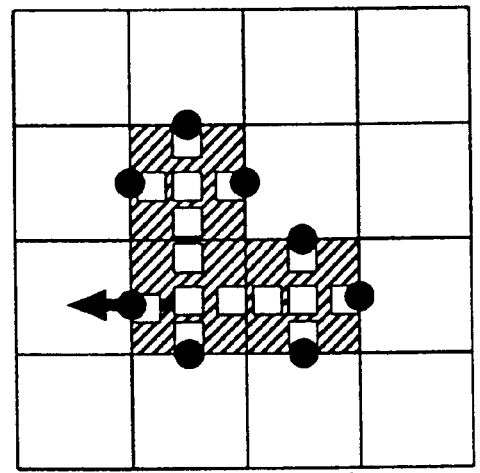
Figure 4A:
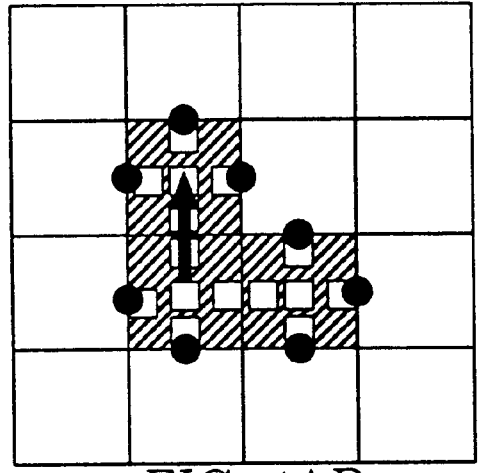
Figure 4A:
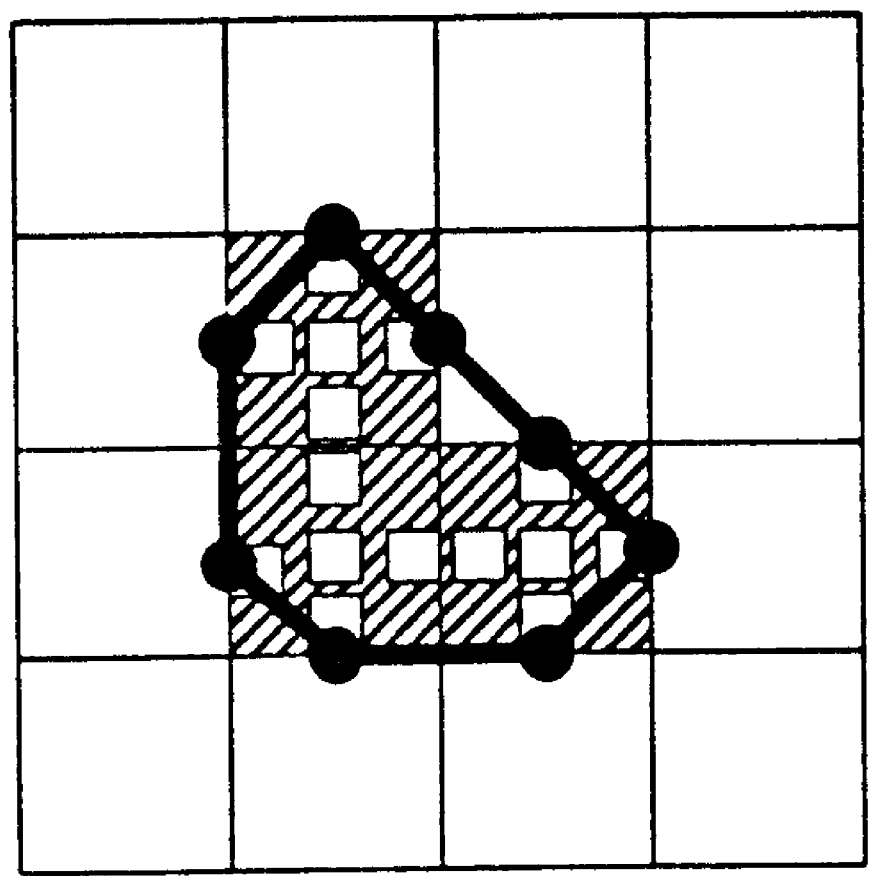

Turning to FIG. 4C, the first pixel found at step 152 (FIG. 2D) is pixel A 40. The counterclockwise most right four-neighbor is in direction 1, as shown by the arrows 42 in FIG. 4C. In FIG. 4D, the arrow is rotated 90 degrees counterclockwise. In FIG. 4E, the current pixel, pixel A, is marked as visited in general. (The white box 44 in the center of the pixel indicates that the pixel is visited in general.) In FIG. 4F, the current pixel, pixel A, is marked as visited from the current direction, the direction being indicated by the arrow and the white box 45 at the edge of the pixel indicating that the pixel is visited from the direction of the edge adjacent to the box 45. In FIG. 4G, the direction is turned 90 degrees clockwise. In FIG. 4H, the neighbor pixel in the current direction is white, so a point is added to the current stroke, illustrated by a black dot on the midpoint of the line segment separating pixel A from its neighboring white pixel. In FIG. 4I, the current pixel is marked as visited from the current direction, direction 1. In FIG. 4J, the current direction is turned 90 degrees clockwise. In FIG. 4K, because the neighboring pixel in the current direction is white, a point is added to the stroke. In FIG. 4L, the current pixel is marked as visited from the current direction. In FIG. 4M, the current direction is turned 90 degrees clockwise. In FIG. 4N, a point is added to the stroke because the neighbor in the current direction is white. In FIG. 4O, the current pixel is marked as visited from the current direction. In FIG. 4P, the current direction is turned 90 degrees clockwise. In FIG. 4Q, because the neighboring pixel, pixel B, is an edge pixel, so the neighboring pixel becomes the current pixel and the direction is turned 180 degrees. In FIG. 4R, the current pixel, pixel B, is marked as visited in general. In FIG. 4S, the current pixel, pixel B, is marked as visited from direction 0, the current direction. In FIG. 4T, the current direction is turned 90 degrees clockwise. In FIG. 4U, the neighboring pixel in the current direction is an edge pixel, so the neighboring pixel, pixel C, becomes the current pixel and the current direction is turned 180 degrees. In FIG. 4V, the current pixel, pixel C, is marked as visited in general. In FIG. 4W, the current pixel is marked as visited from the current direction, direction 1. In FIG. 4X, the current direction is turned 90 degrees clockwise. In FIG. 4Y, the neighbor in the current direction is white, so a point is added to the current stroke. In FIG. 4Z, the current pixel, pixel C, is marked as visited from the current direction, direction 0. In FIG. 4AA, the current direction is turned 90 degrees clockwise. In FIG. 4AB, the neighbor in the current direction is white, so a point is added to the current stroke. In FIG. 4AC, the current pixel is marked as visited from the current direction. In FIG. 4AD, the current direction is turned 90 degrees clockwise. In FIG. 4AE, the neighbor in the current direction is white, so a point is added to the current stroke. In FIG. 4AF, the current pixel is marked as visited from the current direction. In FIG. 4AG, the current direction is turned 90 degrees clockwise. In FIG. 4AH, the neighboring pixel had previously been marked as visited. The neighbor, pixel B, becomes current pixel and the current direction is turned 180 degrees. In FIG. 4AI, the current pixel, pixel B, is marked as visited from the current direction, direction 3. In FIG. 4AJ, the current direction is turned 90 degrees clockwise. In FIG. 4AK, the neighbor in the current direction is white, so a point is added to the current stroke. In FIG. 4AL, the current pixel is marked as visited from the current direction. In FIG. 4AM, the current direction is turned 90 degrees clockwise. In FIG. 4AN, the neighbor in the current direction is white, so a point is added to the current stroke. In FIG. 4AO, the current pixel, pixel B, is marked as visited from the current direction, direction 1. In FIG. 4AP, the current direction is turned 90 degrees clockwise. In FIG. 4AQ, the neighboring pixel in the current direction, pixel A, had been marked as visited from the direction of the current pixel, pixel B, so the loop around the line art is complete and the stroke points may be connected to form a closed contour.

Returning to FIG. 2A, having formed the stroke or contour loops at step 150, the process proceeds to smooth each stroke in step 160.

Turning to FIG. 2E, at step 160 each stroke in the stroke list is optionally smoothed, which simplifies later processing reduces, memory requirements for processing and file storage, and improves image quality. At step 610, the first (next) stroke is selected and a starting point is selected at step 612. At decision step 614, if the current point is not the last point on the stroke, the previous and the next points on the stroke are identified at step 620, and the current point is replaced with the weighted average of itself, the previous point, and the next point. For each coordinate, the current point is given a weight of two and the previous and next points are each given a weight of one. If, on the other hand, the current point is the last point on the stroke at decision step 614, the process continues to decision step 616. If the current point is the last point on the stroke and the first point is the same as the last point on the stroke, then the process proceeds to step 618, where the next point is taken to be the point after the first point on the stroke and the current point is replaced with a weighted average at step 622, as has been described. After step 622, if the current point is not the last point on the stroke, decision step 623, the next point on the stroke becomes the current point at step 624 and the process continues at decision step 614. If, at decision step 616, the first and last points on the stroke are not the same points, the process loops back to step 610 where a new stroke is selected for smoothing or exit occurs if all strokes have been processed. It has been empirically determined that a smoothing process, such as illustrated in FIG. 2E, should be repeated approximately 12 times at step 160 to achieve an optimal result for subsequent processing.

The three-point smoothing described for step 622 has been determined empirically to be useful for a variety of drawing applications. However, the process is not limited to this smoothing technique. Other known techniques may be used, including techniques that use a larger number of points.

Returning to FIG. 2A, at step 170 the process builds polygons from the strokes in the stroke list. Turning to FIG. 2F, for each stroke in the stroke list, step 710, the area of the polygon defined by the points in the stroke is computed at step 712. If the area is positive, decision step 714, the polygon is appended to the polygon list at step 716 and the next stroke is selected from the stroke list at step 710. If, on the other hand, the polygon area is not positive at decision step 714, the stroke is recognized as defining a hole (a sub-polygon) in some polygon. To place the hole properly, the process begins at the beginning of the polygon list, at step 720, and looping through the polygon list at step 722 and decision step 724, finds the first polygon that contains a point of the sub-polygon. At step 726, the sub-polygon is linked to the polygon. After this, the process proceeds to step 710. For ease of computation, the polygon list may be implemented as a doubly-linked list.

The area of the simple polygon may be calculated by any of the well known methods. See, for example, Graphics Gems II, edited by James Arvo, copyright 1991, Academic Press, Chapter I.1, "The Area of a Simple Polygon", by Jon Rokne.

FIG. 3E illustrates two polygons and sub-polygons. Polygon 902 contains sub-polygon (hole) 904, which is linked to polygon 902. Similarly, polygon 906 contains sub-polygon 908. Note, however, that sub-polygon 908 is not linked as a hole to polygon 902.

Returning to FIG. 2A, at step 180 the Delaunay triangulation of all the points in all of the polygons and sub-polygons in the polygon list is generated. The Delaunay triangulation of a set of points is well-known geometrical construction. It is described, for example, in Graphics Gems IV, edited by Paul S. Heckbert, AP Professional (Academic Press, Inc.), copyright 1994, Chapter I.5, "Incremental Delaunay Triangulation", by Dani Lischinski. A. computer program for performing the calculation, the Quick Hull algorithm, is available from the National Science and Technology Research Center for Computation and Visualization of Geometric Structures (the Geometry Center), the University of Minnesota, 1300 South Second Street, Minneapolis, Minn. 55454. This algorithm is described in Barbara, Dobkin, Huhdanpaa, the Quick Hull Algorithm for Convex Hull, Geometry Center Technical Report GCG53, Jul. 30, 1993. The Delaunay triangulation has the property that the circum-circle of every triangle is empty, that is, it contains none of the input points to the triangulation, so that all nearest neighbor pairs of points are represented by edges in the Delaunay triangulation.

Figure 3F:
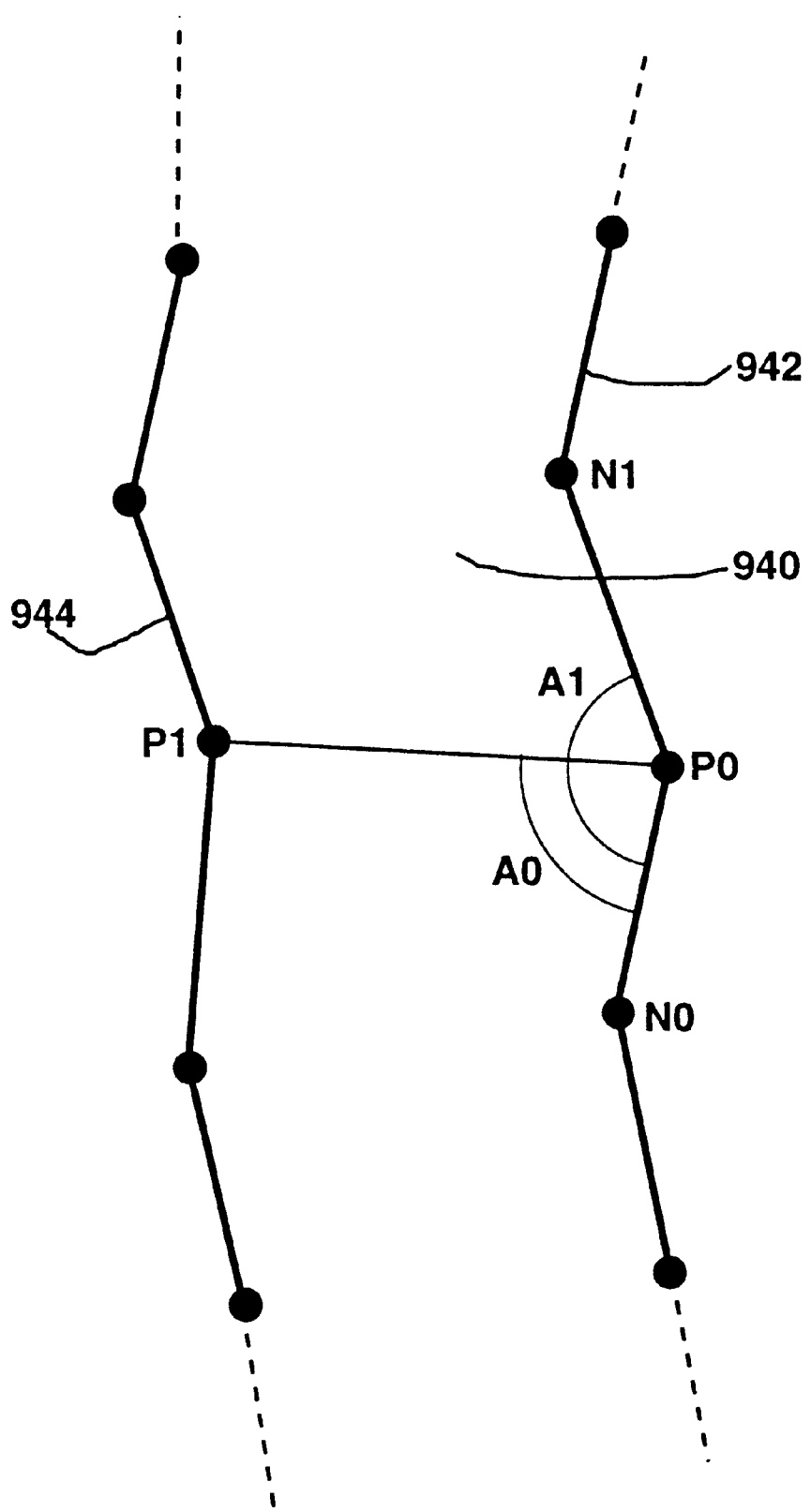
FIG. 3F illustrates terms used in determining whether a link between two points lies inside or outside line art.

At step 190, each edge generated by-the Delaunay triangulation is marked as either inside or outside the line art. Turning to FIG. 3F, a section of a polygon region 940 is illustrated with points 942 forming one border (either inside or outside) of the region, and points 944 forming a complementary border. At step 190, each edge of each Delaunay triangle is considered to determine whether it lies inside or outside of the line art, that is, to determine whether it passes through a polygon region, such as region 912 of FIG. 3G. Triangle edges that connect pairs of points, such as points N1 and P0, are considered to lie outside the line art. The special case of the first and last points in a stroke with identical coordinates is handled by considering the two neighbors of these points to be the second point in stroke list and the second to last point in the stroke list. For all other triangle edges, the process described below will distinguish the inside edges, from the outside edges.

Returning to FIG. 3F, consider a Delaunay triangle edge having edge points P0 and P1. Each of these end points will be points in a stroke. Either of the points—for example, point P0—may be selected. The neighbors of P0 on the stroke in which P0 is found, points N0 and N1, along with the point at the other end of the Delaunay triangle edge, point P1, define two angles: these are illustrated as angle A0 (the angle N0, P0, P1) and angle A1 (angle N0, P0, N1). If angle A0 is less than angle A1, the Delaunay triangle edge P0–P1 is inside the line art region; otherwise, it is outside the line art region.

Figure 3G:
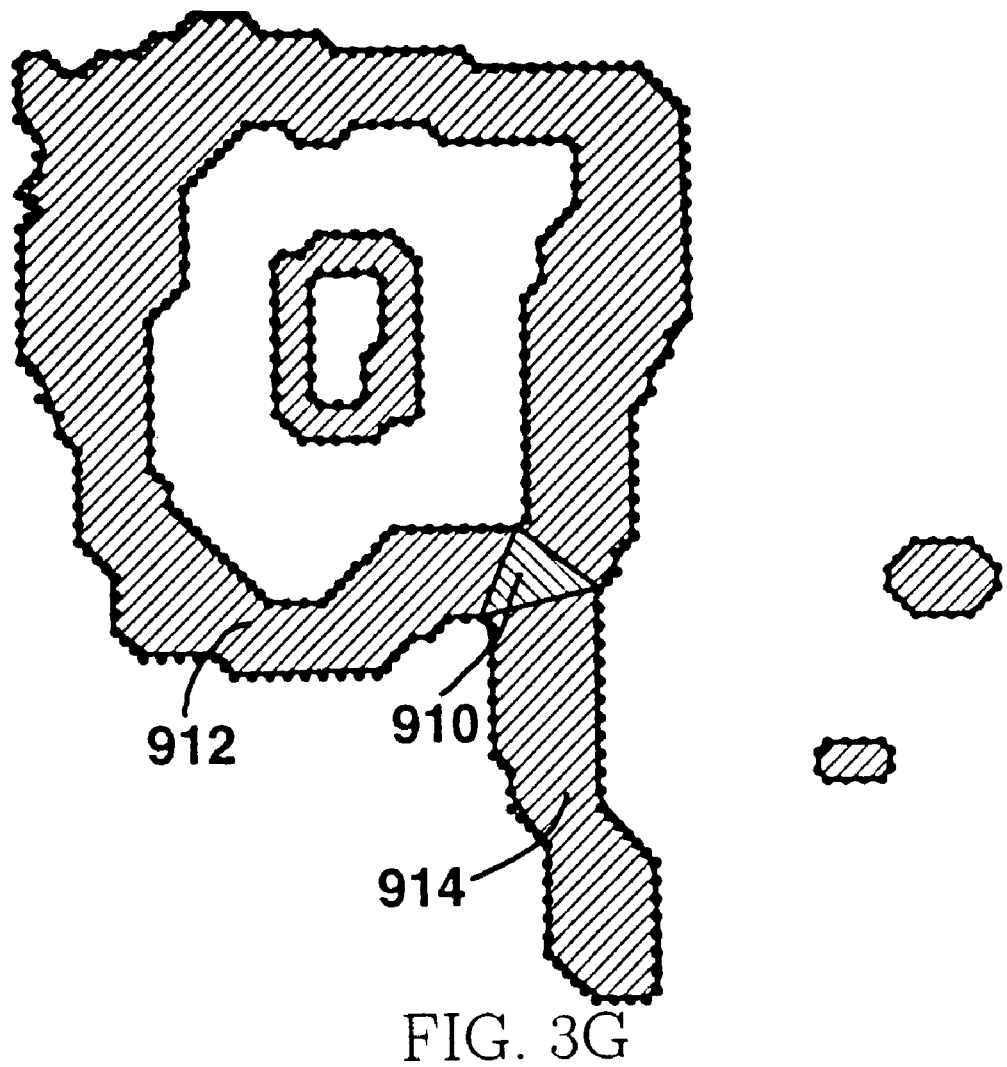
FIG. 3G illustrates the line art polygons of FIG. 3E after the addition of a joint triangle.

Returning to FIG. 2A and FIG. 2G, at step 200 the Delaunay triangles at the joints of the line art region are identified. First, at step 202, all of the Delaunay triangles for which all three edges lie within the line art are identified. These Delaunay triangles indicate the location of a joint in the line art, where the line drawn by the artist diverges into three different directions. These Delaunay triangles are referred to as joint triangles. Of the joint triangles, one may optionally eliminate those that contain an edge with less than a relatively small number of points between edge and points on the same stroke. This would be done to eliminate joint triangles that appear as a result of small bumps in the original line. Thirty points (typically, about 0.1 inches) has been empirically determined to be a useful screen for triangles to be eliminated. All of the remaining joint triangles are added to the polygon list. Adding the joint triangles breaks the line art polygons into smaller pieces at locations that are generally useful for subsequent recoloring of sections of the line art. FIG. 3G illustrates the result of step 200. Triangle 910 is the new polygon (a Delaunay triangle) added to the polygon list at step 206, which divides the original, single polygon line art region into three regions, regions 910, 912, and 914.

The next step, returning to FIG. 2A, is to build the color art boundary skeleton beginning at step 210. Turning to FIG. 2H, the process considers each inside triangle edge (that is, each Delaunay triangle edge that is inside the line art, as determined at step 190, and which therefore is typically a link between points on opposite sides—inside and outside—of the line art) and each end point of each such edge, steps 610 and 612. For each endpoint for each interior edge, the process at step 614 finds all neighbor edges, that is, all edges that share the end point. For each of the neighbor edges, the angle between the selected edge and the neighbor edge is determined and placed in the range from −180° to plus +180°, at step 616. At step 618, for each end point of the selected edge, the neighboring edges with the smallest magnitude negative and positive angles are found. The sign of the angle with the neighboring edge determines on which side of the selected edge that the neighboring edge lies. For each side of the current edge, loop step 620, the following steps are performed. If both end points have a neighbor edge and both neighboring edges lie on this same side of the current edge, then this side of the current edge is on the boundary of a triangle with all three of its edges inside the line art. In this case, the process proceeds to step 626 and nothing is added to the color art skeleton. Otherwise, the process proceeds to step 624 and a line connecting the midpoint of the current edge and the midpoint of the neighbor edge is added to the color art skeleton.

Figure 3H:
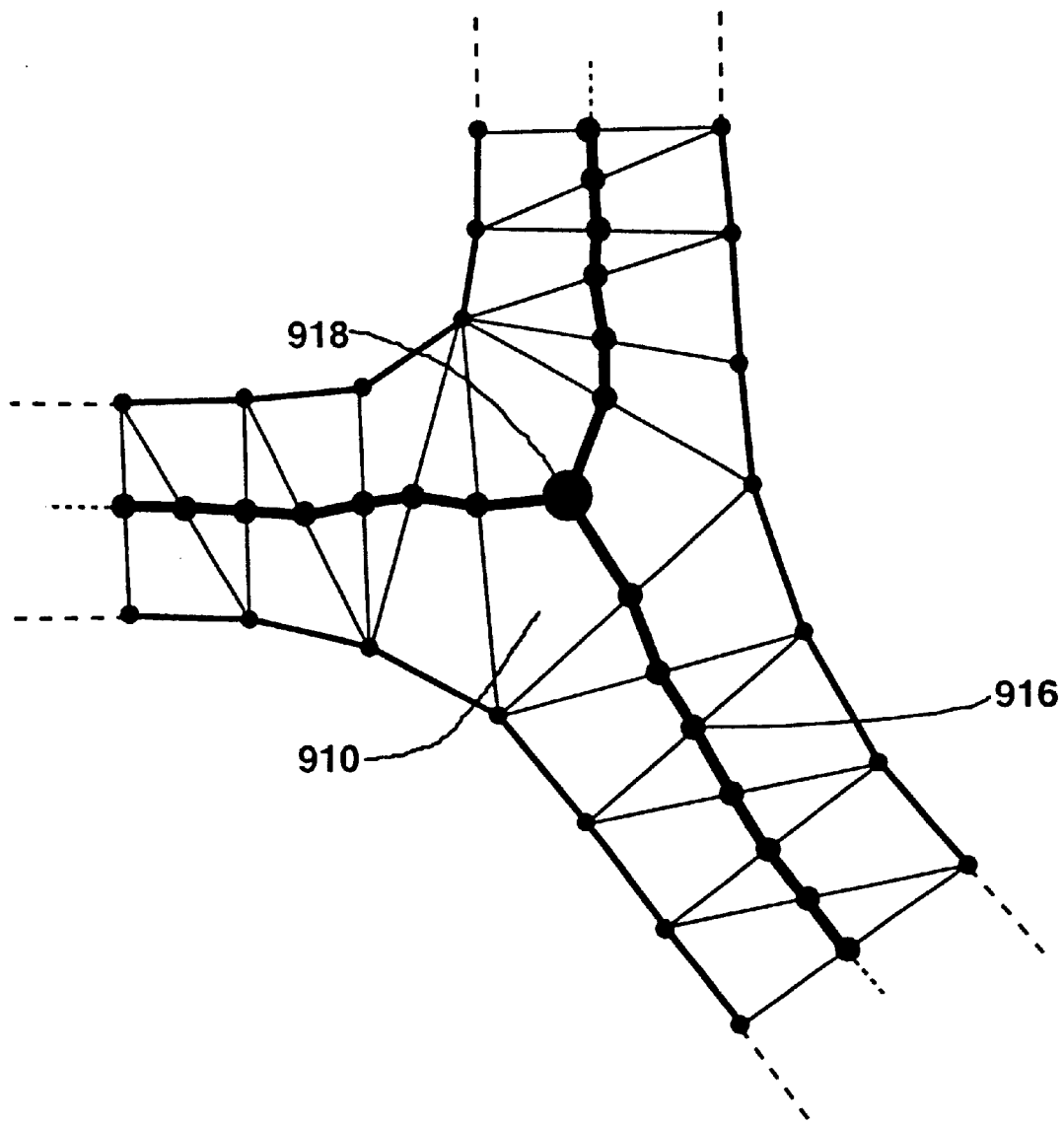
FIG. 3H illustrates Delaunay triangulation and the placement of color art vectors.

When the process of loop steps 610 and 612 is completed, the color art skeleton is nearly connected. What remains to considered is the area within those Delaunay triangles for which all three edges are inside the line art (i.e., the joint triangles). Thus, at loop step 630, for each joint triangle, an interior point of the triangle, such as the centroid, is determined at step 632, and lines connecting this interior point to the midpoints of each side of the triangle are added to the color art skeleton. The result of these steps is illustrated in FIG. 3H, in which one sees the midpoints of the interior Delaunay triangle edges connected to form a color art skeleton, along with vectors joining in an interior point 918 of Delaunay triangle 910 to midpoints of its three edges.

Returning to FIG. 2A, step 220 is an optional step of removing short, dangling strokes from the color art skeleton. A stroke is considered to be dangling if it touches another stroke only at one end point. It has empirically been found effective to remove dangling strokes that are less than 0.05 inches long, which may be generated by irregularities in the line art and generally do not contain useful information. At step 230, the color art skeleton is optionally smoothed. Smoothing may be accomplished by using the method described in connection with FIG. 2E. Turning to that figure, at decision step 616, no smoothing is done if the current point is the last point on a stroke (step 614) and the last point on a stroke is an interior point of a joint triangle. It has been empirically determined that a smoothing process, such as illustrated in FIG. 2E, should be repeated approximately 50 times at step 230 to achieve an optimal result for subsequent processing.

Next, the process optionally performs step 240 to remove superfluous points from the line art polygons and the color art. The result of this deletion process is to reduce the density of points along a stroke where the stroke is relatively straight, while preserving the density where the stroke is curved. Each point that is not the first or last point of the stroke is eligible for deletion. For each stroke, a running sum is initialized to zero at step 244. Turning to FIG. 2J, the process loops over each stroke, step 242, beginning with the first point of each stroke, step 243, and after the first loop, the next point in the stroke becomes the current point at step 244. If the current point is the last point in the stroke, decision step 246, the process for the current stroke is completed. Otherwise, at step 710 the angle between the previous point, the current point and the next point is calculated. At decision step 712, this angle is compared to a threshold. In the case of line art, a threshold angle of 2 degrees is selected, based on empirical considerations. In the case of color art, the empirically determined value is 9 degrees. If the angle at decision step 712 is greater than the threshold angle, the running sum is set to zero at step 716 and the process loops back to step 244. Otherwise, the process proceeds to decision step 714, where the sum of the angle is calculated and the running sum is compared to a second threshold. The threshold for step 714 is 3 degrees (empirically determined) for line art and 12 degrees (empirically determined) for color art. If the threshold is exceeded, the process proceeds to step 716, as has been described; otherwise, the current point is deleted from the stroke at step 720 and the angle calculated at 710 is added to the running sum at step 722. The process then loops back and advances to the next point in the stroke at step 244.

Returning to FIG. 2A, at step 250 the process optionally closes gaps in the color art skeleton. This step may be omitted in applications in which small gaps in the color art skeleton are acceptable. Turning to FIG. 2K, in step 252 the Delaunay triangulation of dangling stroke end points (that is, end points that are not end points of any other stroke) is calculated to determine the nearest-neighbor relationships between the ends of the dangling strokes. Each edge in the triangulation is a possible connection that may close a gap. The connecting strokes are added in order of increasing size (up to an empirically determined maximum 0.1 inches), step 254, and are only added if the end points-are still dangling, decision step 255. If the end points of the edge are dangling, the edge is added to the color art skeleton, step 256. In either case, the proces loops back step 253 to take the next larger Delaunay triangulation edge.

Figure 3I:
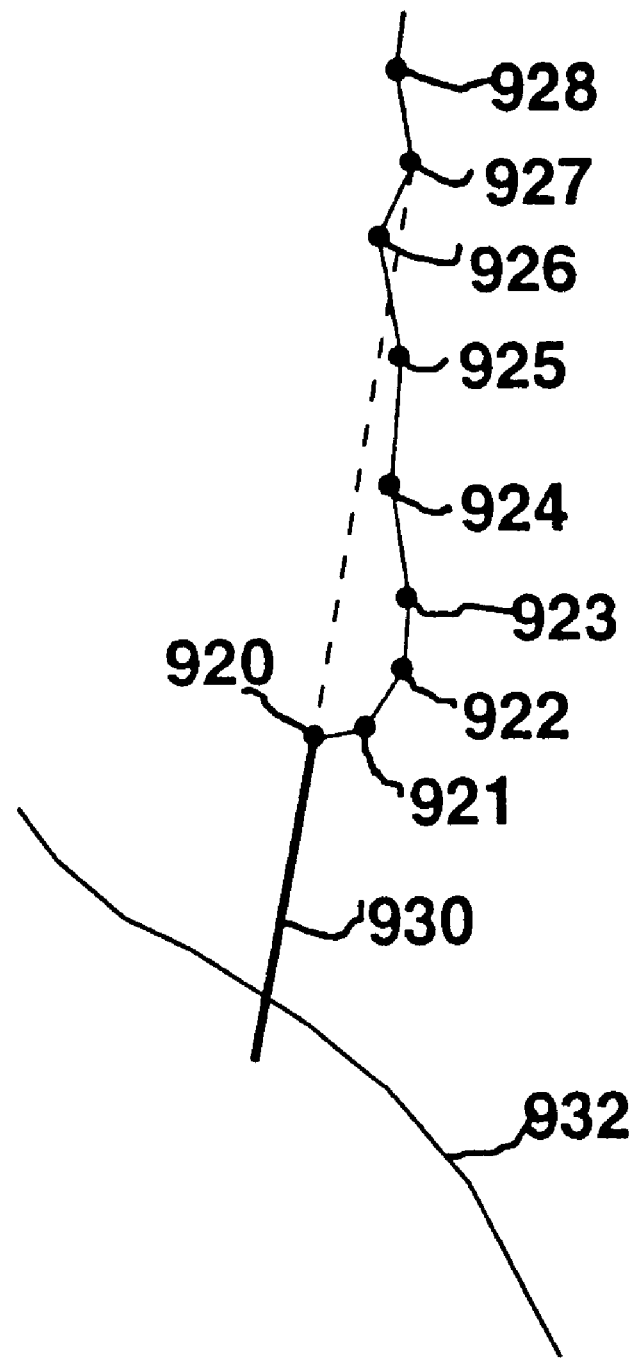
FIG. 3I illustrates the extension of a dangling stroke.

Returning to FIG. 2A, the color art skeleton is optionally extended at step 260 to intersect existing strokes. Turning to FIG. 2L, loop step 262, the following steps are performed for each color art dangling end point. At step 264, a short extension of the dangling stroke is defined. For simplicity, the extension may be of a fixed length, such as 0.1 inches; alternatively, variable lengths may be used, or extensions may be made to extend a dangling stroke to the first intersecting stroke. Turning to FIG. 3I, a dangling color art stroke, with end point 920 and preceding points 921 through 928, is extended by vector 930. The direction of vector 930 is determined by taking the eighth point (empirically determined) from the dangling end (point 927) and extending it through the end point 920. If the dangling stroke is less than eight points long, the other end, rather than the eighth point, is used to define the direction of the extension. If the extension 930 intersects an existing stroke, such as is illustrated by stroke 932, the extension is added to the dangling art stroke at step 268. This process closes gaps in the color art that do not result in two nearby dangling strokes.

The present invention has been described in terms of specific embodiments. The invention, however, is not limited to these specific embodiments. Rather, the scope of the invention is defined by the following claims, and other embodiments are within the scope of the claims. For example, the vectors defining line art and color art could be curved segments, such as circular arcs, splines, or bézier curves. Also, alternative, known definitions of dirt may be used to delete more or less of the original bitmap before the tracing of line art begins. Alternative, known techniques to the use of an area calculation for determining the winding order of a polygon may be used in place of the method of calculating areas.

Also, for ease of implementation, various lists of points, strokes, and polygons are described as having particular orders. In all cases, the invention may be implemented with alternative orderings and with alternative, known data structures. Also, alternative, known methods, such as the point-in-polygon test, may be used to determine whether a triangulation edge lies within the lie art. Also, alternative, known techniques may be used for identifying joints in the line art, in place of the technique of using joint triangles in the triangulation. Also, alternative, known techniques for building color art strokes from the triangulation edges may be used, such as a modified Euclidian spanning tree calculation of the interior points chosen from the interior links. Also, when adding a point for the color art within a joint triangle, the centroid is suggested, but other known techniques for determining an interior point may be used.

Also, a constrained Delaunay triangulation may be used in place of exact Delaunay triangulation for defining the color art. A constrained Delaunay triangulation takes as input both a set of points and a description of the boundary of the triangulation. If a constrained Delaunay triangulation is used for defining the color art, filtering of the line art points may be performed before calculating the triangulation. Also, an approximate Delaunay triangulation may be used for defining the color art. Also, an approximate Delaunay triangulation may be used for calculating and closing gaps.

Also, when finding the edges of a Delaunay triangulation, any of the known techniques for finding pairs of nearest-neighbors in a set of points may be used in place of the Delaunay triangulation, such as calculating the Voronoi diagram or exhaustive pair-wise search. Similarly, when closing gaps, any of the known techniques for finding pairs of nearest-neighbors in a set of points may be used in place of Delaunay triangulation. Also, when closing gaps, rather than adding gap-connecting strokes in increasing size order and only adding those that still close a gap, all or any subset of the gap-connecting strokes may be added in any order.

Also, when extending the ends of dangling strokes in the color art, alternative, known methods for extending, or extrapolating from, a set of points may be used for determining the direction of the extension. Also, when extending the ends of dangling strokes in the color art, alternative, known methods may be used for determining the length of the extension. Also, when extending the ends of dangling strokes in the color art, alternative, known methods may be used for determining whether an extension should be added to the color art, such as the length of the stroke being extended, the overall or local complexity of the vector image, or the distance to the nearest vector.

Also, point smoothing and point filtering for line art and color art may be performed by using alternative, known methods, including methods using measures based on the size of a stroke, the desired quality of the line art or color art, desired file size for the vectorization, the deviation of the path of a stroke for its original position, the deviation of the area of an enclosed polygon from its original area, the fit of a curve or function to existing points, and pseudo-random variation.

Also, the calculation and/or breaking of some or all of the line art at joints may be omitted. Also, the line art may be broken in an arbitrary manner, such as with a regular grid, rather than based on its characteristics, such as joints of the line art. Also, if only the vector line art is required, for example, where the vectorized image is to be used for a "pencil test", the color art calculation may be omitted. Also, if only the vector line art is required, the calculation and insertion of line art joints may be omitted. Also, if only the vector color art is required, the calculation and insertion of line art joints may be omitted.

Also, during contour tracing, rather than using the midpoint of the separation between an edge pixel and a neighboring white pixel as the next point on the contour, other points may be used, including, for example, the corners of the edge pixel, the center of the edge pixel, pseudo-random points near the edge pixel, multiple points for each edge pixel, and no points for particular edge pixels.

Also, during contour tracing, white pixels bordering on black pixels (or, in pixmaps of depth greater than 1, bordering non-white pixels) may be marked or identified as edge pixels.

Also, rather than tracing using four-neighbors and 90° turns, the process may use neighbors of other orders and turns of corresponding size, such as eight-neighbors and 45° turns.

Also, rather than using the winding order (clockwise versus counterclockwise) to discriminate outer polygons from holes, alternative techniques that allow arbitrary winding order may be used. For example, discrimination may be achieved by keeping track of number of contour edges that are crossed when looking in a particular direction from a given contour, where an odd number would indicate a hole was being traced in an even number, an outer polygon. Alternatively, the relationships between all pairs of polygons (such as A is enclosed by B, A enclosed B, no intersection between A and. B) may be calculated during tracing of contours or after all contours are traced. Then, if A is enclosed by an odd number of polygons, it is a hole of the smallest of the enclosing polygons; otherwise, if A is enclosed by an even number of polygons, then A is an outer polygon.

Also, the deletion of "dirt" may be delayed to be performed on the vector, rather than on the pixmap, representation. The criteria for identifying dirt may be extended to include geometric quantities such as region area, length, and shape.

Also, if output reflecting colors or gray scale values of the original pixmap is desired, the invention (or any of its variations) may be applied multiple times to multiple bitmaps derived from the original pixmap. Thus, for example, rather than thresholding the original image at 50%, as described above, the image may be thresholded at each gray level and processed separately, combining the resulting vector images into one output image. The combination may be made, for example, by including in the areas captured by the lighter gray levels the vector images for the darker gray levels, thereby simply layering the line art for various gray levels with the darker gray levels below the lighter gray levels. When computing the color art and breaks in the line art, the darkest gray level may be used, and the line art breaks determined for the darkest gray level may be applied to all of the other images.

These multiple layer techniques may be also applied to the processing of color images. By such a separations a drawing with black ink (indicating lines that appear in the cel) and red ink (indicating point boundaries that do not appear as lines in the cel) is separated and processed to generate a vectorized image output having color art vectors, where the red ink was, without corresponding line art vectors or with the red ink line in the line art vectors but identifiable from block line art.

Also, colors or gray scale values may be grouped and fewer vector images may be computed than there are unique colors or gray scale values in the original image.

What is claimed is:

1. A computer-implemented method for converting a pixmap representing a drawing into a set of vectors representing the drawing, comprising the steps of:

(a) forming closed loops of vectors corresponding to boundaries between edge and non-edge pixels in the pixmap;

(b) identifying each closed loop as defining an outer perimeter or as defining a hole associated with some particular outer perimeter;

(c) for each outer perimeter, identifying as an ink art region an area defined by the outer perimeter minus any areas defined by any holes associated with the outer perimeter;

(d) creating a color art graph of vectors by creating connected color art vectors within the ink art region, the color art graph extending substantially to all extrema of the ink art region and separately enclosing all holes within the ink art region;

(e) smoothing one of the closed loops; and (f) wherein the step of smoothing is done by moving points of the closed loop vectors toward a weighted average of their positions and their neighboring points' positions.

2. The method of claim 1, further comprising the step of if a part of the ink art region forms a "Y" shape, creating a central ink art region at the join of the "Y" shape.

3. The method of claim 2, wherein the central ink art region is formed by calculating a Delaunay triangulation of points defining the boundary of the ink art region and then defining the central ink art region as corresponding to a Delaunay triangle all of whose sides are interior to the original ink art region.

4. The method of claim 1, further comprising the step of closing gaps between dangling ends of the color art graph.

5. The method of claim 1, further comprising the step of extending a dangling end of the color art graph to join a nearby section of the same or a different color art graph.

6. The method of claim 1, wherein the step of identifying each, closed loop as defining an outer perimeter or a hole includes distinguishing closed loops oriented clockwise from closed loops oriented counterclockwise.

7. The method of claim 6, wherein the step of identifying each closed loop as defining an outer perimeter or a hole includes calculating a signed area of at least one closed loop.

8. The method of claim 1, wherein the step of creating a color art graph includes creating a set of interior vectors and taking a non-end point of each interior vector of the set as an end point to a color art vector within the ink art region.

9. The method of claim 1, further comprising the step of creating the pixmap by steps including scanning the drawing into a computer with an optical scanner to obtain a scanned raster of pixels representing the drawing.

10. The method of claim 1, further comprising the step of removing dirt.

11. The method of claim 1, further comprising the step of smoothing one of the closed loops.

12. The method of claim 11, wherein the step of smoothing is done by moving points of the closed loop vectors toward a weighted average of their positions and their neighboring points' positions.

13. The method of claim 1, further comprising the step of smoothing the color art graph.

14. The method of claim 13, wherein the step of smoothing is done by moving points of color art vectors toward a weighted average of their positions and their neighboring points positions.

15. The method of claim 1, further comprising the step of filtering vectors by replacing sequential and approximately colinear vectors with a resultant vector.

16. The method of claim 1, wherein the vectors of the closed loops are straight line segments.

17. The method of claim 1, wherein the color art vectors of the color art graph are straight line segments.

18. A system for converting a drawing represented in a pixmap of pixels into a vector representation of the drawing, comprising:
    (a) means for forming closed loops made up of edge vectors by following boundaries between edge pixels and non-edge pixels;
    (b) means for building ink art regions from loops so that each ink art region is a continuous region enclosed by edge vectors;
    (c) means for finding nearest neighbors among a set of boundary points of the ink art regions and linking them with link segments; and
    (d) means for identifying those link segments between nearest neighbors that pass through the interior of one of the ink art regions, such link segments defining interior links.

19. The system of claim 18, further comprising means for creating a color art graph by tracing a connection from an interior point of one interior link of an ink art region to its neighboring interior links of the same ink art region to define a color art vector of the color art graph.

20. The system of claim 19, where the interior point of each interior link is the midpoint of such interior link.

21. The system of claim 18, further comprising:
    (e) means for removing dirt;
    (f) means for smoothing ink art regions;
    (g) means for smoothing color art graphs;
    (h) means for filtering vectors from boundaries of ink art regions;
    (i) means for filtering vectors from color art graphs;
    (j) means for extending a color art graph to close gaps between dangling ends;
    (k) means for extending a color art graph to join a dangling end to a nearby section of the same or a different color art graph;
    (l) means for removing registration holes from the pixmap; and
    (m) means for translating, resizing, and rotating color art graphs and ink art regions.

22. A computer-implemented method for converting a pixmap representing a drawing into a geometric point-based representation of the drawing, comprising the steps of:
    (a) forming closed loops of points by tracing boundaries between edge and non-edge pixels in the pixmap;
    (b) identifying each closed loop as defining an outer perimeter or as defining a hole associated with some particular outer perimeter;
    (c) identifying as an ink art region an area defined by an outer perimeter minus areas defined by any holes associated with the outer perimeter; and
    (d) creating a color art graph consisting essentially of connected points within the ink art region, the color art graph extending substantially to all extrema of the ink art region and separately enclosing any holes within the ink art region.

23. The method of claim 22, wherein the pixmap has at least a first color and a second color of non-white pixels and after such colors of non-white pixels are used in creating color art graphs, any closed loops formed by tracing first color non-white pixels are distinguished from any closed loops formed by tracing second color non-white pixels.

24. A computer-implemented method for converting a pixmap representing a drawing into a geometric point-based representation of the drawing, comprising the steps of:
    (a) forming closed loops of points by tracing boundaries between edge and non-edge pixels in the pixmap;
    (b) identifying each closed loop as defining an outer perimeter or as defining a hole associated with some particular outer perimeter;
    (c) identifying as an ink art region an area defined by an outer perimeter minus areas defined by any holes associated with the outer perimeter;
    (d) calculating nearest-neighbor vectors joining nearest-neighbors among those points that define the ink art region;
    (e) identifying those nearest-neighbor vectors that lie interior of the ink art region; and
    (f) identifying as a location to break the line art region the location of an interior nearest-neighbor vector that has, at each end of itself, a nearest-neighbor vector connected to itself and lying on the same side of itself.

25. A computer-implemented method for converting a pixmap representing a drawing into a set of vectors representing the drawing, comprising the steps of:
    (a) forming closed loops of vectors corresponding to the boundaries between edge ad non-edge pixels in the pixmap;
    (b) identifying each closed loop as defining an outer perimeter or as defining a hole associated with some particular outer perimeter;
    (c) for each outer perimeter, identifying as an ink art region an area defined by the outer perimeter minus any areas defined by any holes associated with the outer perimeter;
    (d) creating a color art graph of vectors by creating connected color art vectors within the ink art region, the color art graph extending substantially to all extrema of the ink art region and separately enclosing all holes within the ink art region;
    (e) smoothing the color art graph; and
    (f) wherein the step of smoothing is done by moving points of color art vectors toward a weighted average of their positions and their neighboring points positions.

* * * * *